(12) United States Patent
Meulenbelt

(10) Patent No.: US 7,841,733 B2
(45) Date of Patent: Nov. 30, 2010

(54) DISPLAY DEVICE

(75) Inventor: Matthijs Dirk Meulenbelt, Borne (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 259 days.

(21) Appl. No.: 12/089,720

(22) PCT Filed: Oct. 11, 2006

(86) PCT No.: PCT/NL2006/050256

§ 371 (c)(1),
(2), (4) Date: Aug. 22, 2008

(87) PCT Pub. No.: WO2007/043886

PCT Pub. Date: Apr. 19, 2007

(65) Prior Publication Data

US 2009/0129054 A1    May 21, 2009

(30) Foreign Application Priority Data

Oct. 11, 2005   (NL) .................................... 1030161

(51) Int. Cl.
*G09F 13/04* (2006.01)

(52) U.S. Cl. .................. 362/97.1; 362/223; 362/30; 362/812

(58) Field of Classification Search .............. 362/222, 362/223, 260, 330, 332, 23, 30, 812, 97.1; 40/541, 564, 361
See application file for complete search history.

(56) References Cited

U.S. PATENT DOCUMENTS

| 4,849,864 | A | * | 7/1989 | Forrest ..................... 362/225 |
| 5,365,411 | A |   | 11/1994 | Rycroft et al. |
| 5,457,615 | A | * | 10/1995 | Nezer ....................... 362/223 |
| 6,942,366 | B2 | * | 9/2005 | Mohacsi ................... 362/300 |
| 2005/0024845 | A1 |   | 2/2005 | Mori et al. |

FOREIGN PATENT DOCUMENTS

| DE | 3931668 A1 | 4/1991 |
| DE | 10353760 A1 | 6/2005 |
| GB | 2209422 A | 5/1989 |
| WO | WO9967663 A1 | 12/1999 |
| WO | 0175847 A1 | 10/2001 |
| WO | WO02089101 A1 | 11/2002 |
| WO | 2005067570 A2 | 7/2005 |

* cited by examiner

*Primary Examiner*—Ali Alavi

(57) ABSTRACT

A display device such as a light box comprises: a housing; a light source accommodated in this housing; and at least one diffusely translucent display face illuminated by the light from this light source.

Orienting means are added to the light source so as to obtain a directional characteristic of the light emitted by the light source such that the light source directly illuminates at least one wall almost exclusively.

This at least one wall is diffusely reflective such that a part of the light incident thereon is reflected to the display face. This has an almost constant luminance as a result.

17 Claims, 21 Drawing Sheets

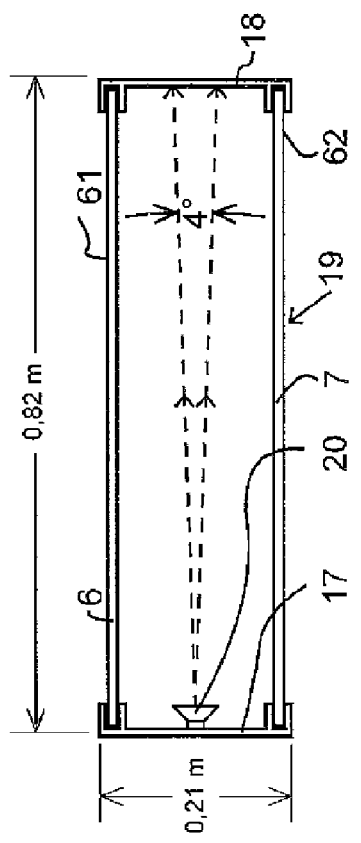
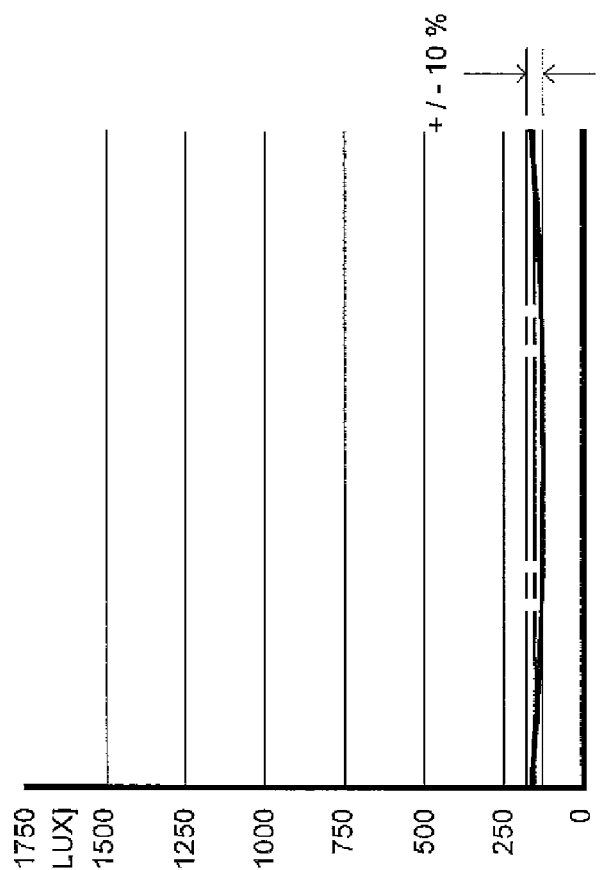
FIG. 9A
FIG. 9B
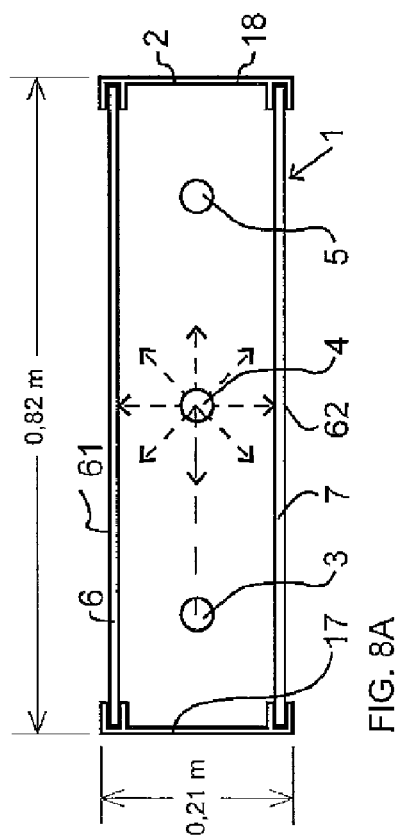
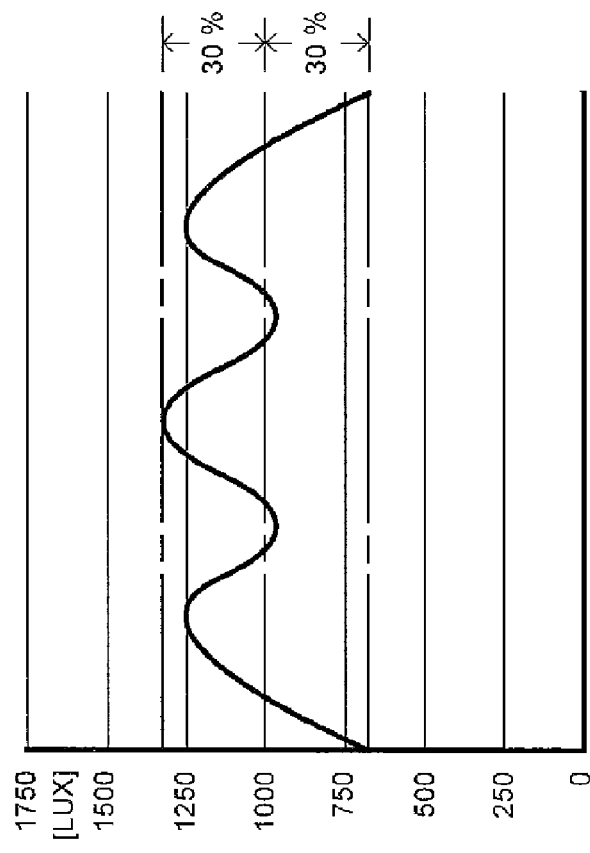
FIG. 8A
FIG. 8B

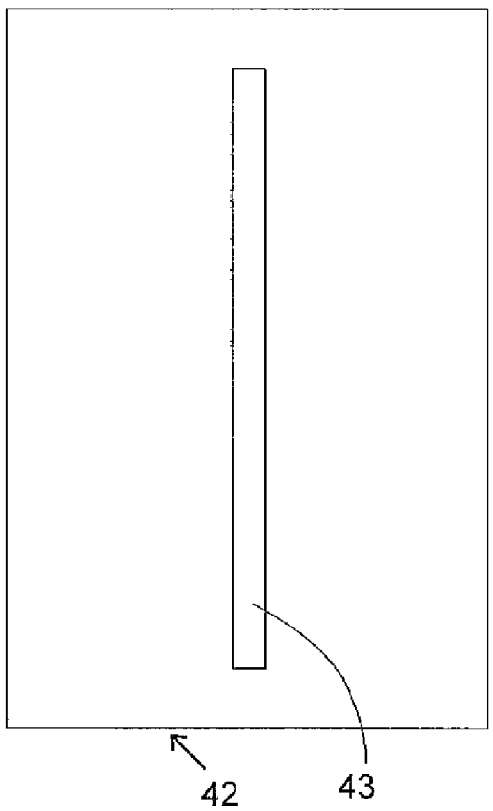
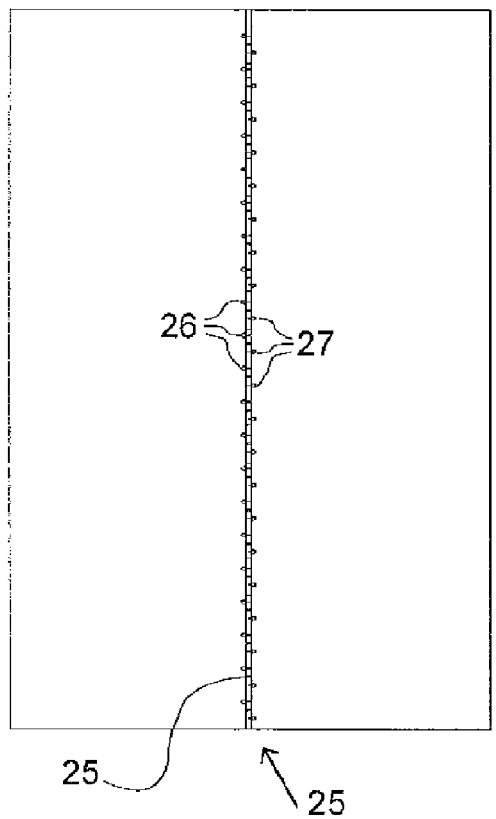
FIG. 13A                FIG. 14A
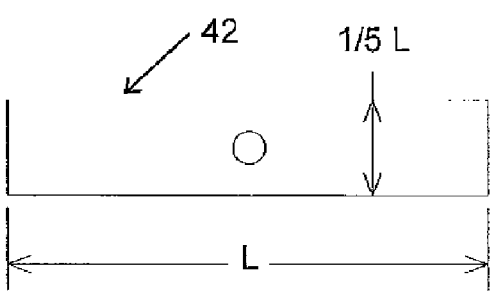
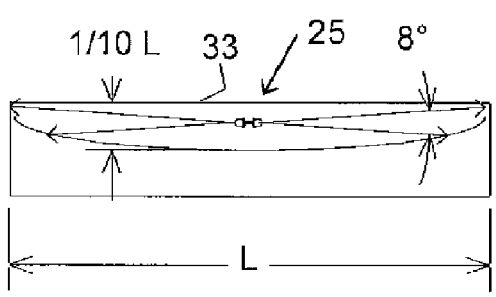
FIG. 13B                FIG. 14B
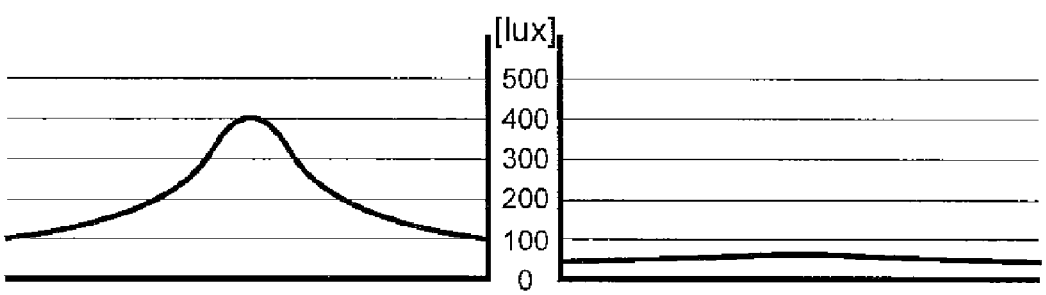
FIG. 13C                FIG. 14C — : exit window at a distance of 0.1 m
—○— : exit window at a distance of 0.2 m
—□— : exit window at a distance of 0.3 m
—△— : exit window at a distance of 0.4 m
—*— : exit window at a distance of 0.5 m
—●— : exit window at a distance of 0.6 m

DISPLAY DEVICE

The invention relates to a display device such as a light box, for instance for an illuminated advertisement, a traffic sign, a signpost, an illuminated ceiling, a TFT screen, an LCD screen, a dial for a clock or a measuring instrument, which device comprises: a housing; a light source accommodated in this housing; and at least one diffusely translucent display face illuminated by the light from this light source.

Such a display device is known in many embodiments.

A device of the type stated in the preamble is for instance known from U.S. Pat. No. 5,457,615. In the display device known herefrom use is made of a number of omnidirectional light sources to illuminate a diffusely translucent display face. The inner surfaces take a reflective form. By means of a diffusely translucent plate, referred to as a diffuser, the light emitted by the lamp in the direction of the display face is intercepted and diffused by this diffusely translucent plate.

The description of U.S. Pat. No. 5,457,615 gives no indication whatever as to the degree of diffusivity of the passage of light through the diffusely translucent plate. It must however be assumed that the light sources are visible to an observer on the outer side of the device, this being deemed undesirable according to the invention. A substantial part of the light emitted by the light sources thus reaches the display face directly via the diffusely translucent plate. The remaining part of the light emitted by the light sources is reflected in specular manner by the highly mirror-reflective inner surfaces of the housing and, after a number of reflections, reaches the display face in a manner not further specified. Due to this mirror reflection it is not possible to prevent the light sources being visible on the outer surface of the display face, whereby darker and lighter zones result. The transitions therebetween can be readily detected by the human eye. If the contrast transition exceeds a determined value over a short distance, this can manifest itself in a very irritating way. This aspect will be discussed hereinbelow.

The structure according to U.S. Pat. No. 5,457,615 is further such that light from the end zones of the elongate light sources can reach the display face directly.

Brief attention should be paid at this point to the diverse possibilities, known from the literature or lying within the reach of the skilled person, for irradiating a diffusely translucent display face such that the luminance is made as uniform as possible on the outer surface thereof:

1. Use can be made of a diffusely translucent display face with a substantial thickness and/or a very limited light-transmission. It must be understood that in this manner a certain homogenization can be achieved for a material for instance such as white glass or functionally corresponding diffusely translucent plastics. The drawback of this solution is that the loss of light energy can be very substantial. This would meant that, to achieve a determined luminance, use must be made of a light source which consuming a relatively large amount of energy.
2. As alternative, use can be made of a number of diffusely translucent plates, which are placed at a mutual distance and which are for instance identical or similar to the display face. An improved degree of homogeneity of the luminance on the outer surface of the display face is realized due to the mutual distance between such plates. This per se good solution also has the drawback of resulting in a great loss of light energy.
3. As the distance of the source to the display face increases, the homogeneity of the luminance on the outer surface of this display face will improve. The drawback of this solution is that the housing becomes voluminous, and particularly acquires a great depth, which is undesirable and sometimes even unacceptable for specific applications. It must further be assumed that the light which is not oriented directly at the display face by the light source must be absorbed, since unpredictable reflection effects perhaps otherwise occur, which cause the luminance to increase but have an adverse effect on the homogeneity.
4. Use can be made of a light source with a large radiating surface. It is for instance possible to envisage a surface provided with a grid-like pattern of small light sources such as halogen lamps or LEDs. While with good design such a solution can produce a reasonable degree of homogeneity of the luminance on the outer surface of the display face, the high costs are prohibitive.
5. Use can be made of optical means, in particular lenses, mirrors or combinations thereof, which are designed such that the luminance on the outer surface of the display face is constant within a certain tolerance. The designing of such systems is however complicated, being wholly dependent on the relevant dimensioning, and is correspondingly expensive.

A display device for advertising purposes incorporating one or more fluorescent lamps as light source is further generally known and common. Such a display device has the apparent advantage of a high light output. This is however countered by the drawback, which is dominant in practice, that the diffusely translucent display face has a high light intensity in an area a relatively short distance from the fluorescent lamp. This light intensity does however decrease quickly as the distance of the illuminated area of the display face relative to the fluorescent lamp decreases. This surprisingly results in the phenomenon that, despite the high realized light intensity in said first area, the total readability is often perceived as very poor due to the differences in contrast with the less strongly illuminated areas.

Attempts have been made to obviate this known inconvenience by the use of more than one fluorescent lamp or other light source, but the stated drawback of a strongly illuminated area contrasting with less strongly illuminated areas cannot hereby be obviated satisfactorily. In anticipation of the figure description following hereinbelow, reference is now made in this respect to FIGS. 1, 2, 3, 8A and 13 and the description associated with said figures.

Attempts have further been made to reduce the differences in intensity by arranging a grid with a specific progression, which shields the light from the light source locally to a greater or lesser extent. Not even with this have the desired results been achieved.

It is an object of the invention to embody a display device such that the display face is illuminated homogeneously within relatively close tolerances. Tests have indicated that it is not only the luminance, but to an increasingly predominant extent the homogeneity of the luminance which determines the visibility of the information present on the display face, for instance the legibility of texts present thereon. For light boxes it is possible to envisage for instance a luminance in the range of about 10-5,000 lux. It will be apparent that, particularly in some of the stated applications, such as advertising signs and traffic signs, this is of essential importance.

On the basis of the above considerations the invention provides a display device of the type stated in the preamble, which has the feature that orienting means are added to the light source so as to obtain a directional characteristic of the light emitted by the light source such that the light source directly illuminates at least one wall almost exclusively, for instance for more than 75%; and that this at least one wall is diffusely reflective such that a part of the light incident thereon is reflected to the display face.

Anticipating the description of the figures following hereinbelow, reference is made to FIG. 24 in respect of the term "diffusely reflective". This figure shows in two dimensions the substantially spherical directional characteristic corresponding with diffuse reflection. The origin of the drawn co-ordinate system, i.e. [x=0; y=0], is the point where light is incident upon the diffusely reflective surface. Light will be reflected according to the drawn directional diagram substantially independently of the direction in which this light incidence occurs. The largest fraction will leave the surface perpendicularly thereof, so in the direction of the y-axis. In the direction of the x-axis the fraction will be substantially 0. The intermediate relatively values are given by the distance between the origin and the sphere which is shown in two dimensions as a circle. These values are indicated schematically with arrows.

A display device according to the invention is recommended wherein the proportion of the light energy of the light which is oriented directly at the display face by the light source and exits through the display face amounts to less than 10% of the total light energy of the light emitted by the light source. This prevents the light source being visible to an observer.

Highly recommended is an embodiment in which the first derivative to the position of the luminance on the outer surface of the display face divided by the local value of the luminance has a maximum value of about 1.0-1.2 $m^{-1}$ in any direction. Tests have shown that said value forms the transition between a good homogeneity as perceived by the human eye and the discernability of differences in luminance. As the value of said normalized first derivative becomes greater, a contrast will become increasingly more discernible and eventually increase to irritating and even unacceptable proportions.

It is noted here that the luminance is a measure which takes into account the subjective properties of the human eye.

It is important that the orienting means ensure that as much of the light emitted by the light source as possible reaches a diffusely reflective wall. The orienting means can be separate means which are added to the light source. Alternatively, the display device can have the special feature that the orienting means are integrated with the light source.

According to a specific aspect of the invention, the display device has the special feature that the orienting means comprise optical means from the group of which mirror means and lens means form part.

Attention is drawn to the fact that known display faces for prior art display devices are embodied as plates, for instance from a milk white plastic or glass, which are completely smooth on both sides. As is known from optics, a light beam incident upon a smooth surface at an angle varying substantially from normal incidence will not enter the medium in question in the case where the so-called Brewster angle is exceeded. In the present case use can be made hereof by allowing part of the light from the light source to be directly incident upon the inner surface of the display face, but at an angle such that said light is in theory wholly reflected and reaches the diffusely reflective wall after reflection. This aspect will be discussed further with reference to FIG. 9C.

It will be apparent that light from the light sources, corresponding for instance to a side lobe of the directional characteristic, must be prevented as much as possible according to the invention from falling directly on the display face in uncontrolled manner. In order to prevent this phenomenon, which occurs in most commercially available light sources, the device according to the invention comprises in a special embodiment shielding means placed between the light source and the display face for the purpose of shielding light oriented directly at the display face by the light source. The influence of imperfections in the light source is hereby wholly eliminated.

In order to ensure the best possible homogeneity of the lighting within close limits, the display device can have the special feature that the light source extends over a distance of at least about 70% of a linear dimension of the display face.

Very simple is an embodiment in which the light source comprises at least one elongate lamp.

This embodiment can for instance have the special feature that the lamp is of the luminescence type, for instance a fluorescent lamp.

A fluorescent lamp has a good efficiency, certainly when compared to light bulbs and the like, and is commercially available in many tones. A fluorescent lamp with a practically white colour has a high efficiency and generates relatively little heat, while the emitted light has an intensity with a good homogeneity.

It has been found that, for the intensity range of about 10-5,000 lux often applied in practice for light boxes, the absolute intensity of the emitted light plays only a subordinate role in the visibility of the information presented, and the homogeneity of the luminance on the outer surface of the display face is a measure of the quality realized. In this respect the display device can have the special feature according to a preferred embodiment that the light source comprises a LED or at least one group of LEDs extending in substantially the same direction. A number of LEDs can be disposed such that they ensure the desired homogeneity of the illumination of the wall within certain set norms.

The embodiment in which the light source extends over a distance of at least about 70% of a linear dimension of the display face can further have the special feature that a group of LEDs are disposed adjacently of each other in a row.

According to yet another aspect of the invention, the display device has the special feature that the or a directly illuminated first wall extends at least more or less in transverse direction relative to the display face.

A further improved homogeneity of the light incident upon the diffuse display face is obtained with a display device comprising at least one second diffusely reflective wall, which receives part of the light reflected by the first diffusely reflective wall and directs a part thereof at the display face.

The display device according to the invention can also have the special feature that the directional characteristic is such that the light source illuminates the or a directly illuminated wall at least more or less homogeneously, or ensures that the directly illuminated wall forms an at least more or less homogeneous line source. For this purpose use can for instance be made of optical means, including lens means and/or mirror means, which ensure the desired directional characteristic. Advance reference is made in this respect to FIG. 4, among others, and the associated description.

According to a further aspect of the invention, the display device has the special feature that the at least one wall is provided with a light coloured, in particular substantially white cover layer consisting of a material from the group which includes: a matt paint, a paint with satin gloss, white paper, LEF film (3M Company trademark). With these materials a sufficiently high reflection coefficient can be obtained in combination with a low colour-dependency of the light absorption.

Attention is further drawn to WO-A-99/67663. As described above, the homogeneity of the luminance on the outside of the display face can be improved by making use of a relatively great thickness and/or a low light-transmission of the diffusely translucent display face. Said prior art document makes use of this insight. In FIG. 5, among others, and the associated description mention is made of materials which can be used for the light box in question. It has been found that the light output is high in the case of a material such as 3635-70, but that there are lighter and darker areas which join in a manner such that the transitions will manifest themselves in irritating manner. Only when other materials are used, in particular the materials P645 and P945, is an acceptable homogeneity of the luminance achieved. The sacrifice this requires is a dramatic loss of light energy.

The invention will now be elucidated with reference to the accompanying drawings. Herein:

FIG. 8A shows a cross-sectional view of the display device according to FIG. 1;

FIG. 8B shows a graphic representation of the light intensity distribution on both display faces in the embodiment according to FIGS. 1 and 8A;

FIG. 9A shows a cross-section through the display device according to FIG. 4;

FIG. 9B shows the light intensity distribution on both display faces of the display device according to FIGS. 4 and 9A;

FIG. 13A shows a cut-away front view of a prior art display device with one fluorescent lamp;

FIG. 13B shows a cross-section through the display device as in FIG. 13A;

FIG. 13C shows the light intensity distribution on both translucent surfaces by the display device according to FIGS. 13A and 13B;

FIG. 14A shows a view corresponding with FIG. 13A of a display device according to the invention in accordance with FIG. 10;

FIG. 14B shows a cross-section through the display device according to FIG. 14A;

FIG. 14C shows the light intensity distribution over the display face of the display device according to FIGS. 10, 14A and 14B;

The figures to be described hereinbelow show schematically, among other things, measuring arrangements with the associated measurement results. All measurements were performed under exactly the same conditions, and wholly comparable as such. Use is thus made of the same display faces for all measured display devices. For the measurements to be described hereinbelow a cast opal acrylate plate 100-27006 with glossy surfaces from the Vink company, Netherlands, is applied in each case for the display face. This material has a light transmission coefficient of 29%. This is a common material for light boxes in the Netherlands.

Figure 1:
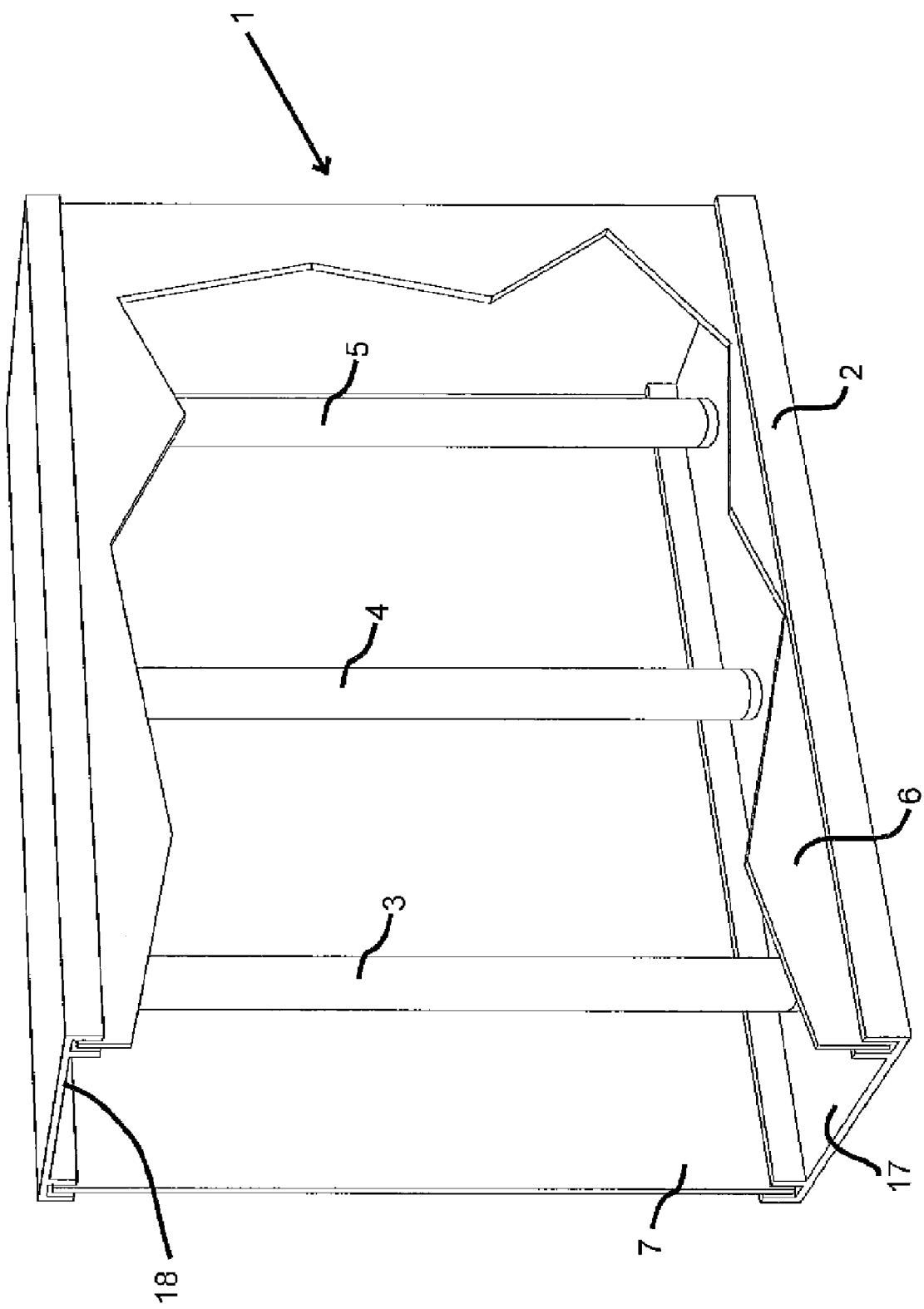
FIG. 1 shows a partly cut-away perspective view of a prior art display device.

FIG. 1 shows a prior art display device 1. This comprises a housing 2, only the top and bottom wall of which are shown. Accommodated in this housing is a light source comprising three fluorescent lamps 3, 4, 5. Situated on both the front and rear side is a display face 6, 7 respectively. These can comprise translucent or opaque optical information patterns, for instance sign post information or advertising.

Display faces 6, 7 are illuminated directly by fluorescent lamps 3, 4, 5.

FIG. 8A shows display device 1 in cross-section.

FIG. 8B shows graphically the intensity distribution of the light on outer surfaces 61, 62 of the respective display faces 6, 7. As the figure clearly shows, the central value of the light intensity is about 1,000 lux, with variations of +30% and −30%. This great variation over a short distance is often perceived as irritating.

Figure 2:
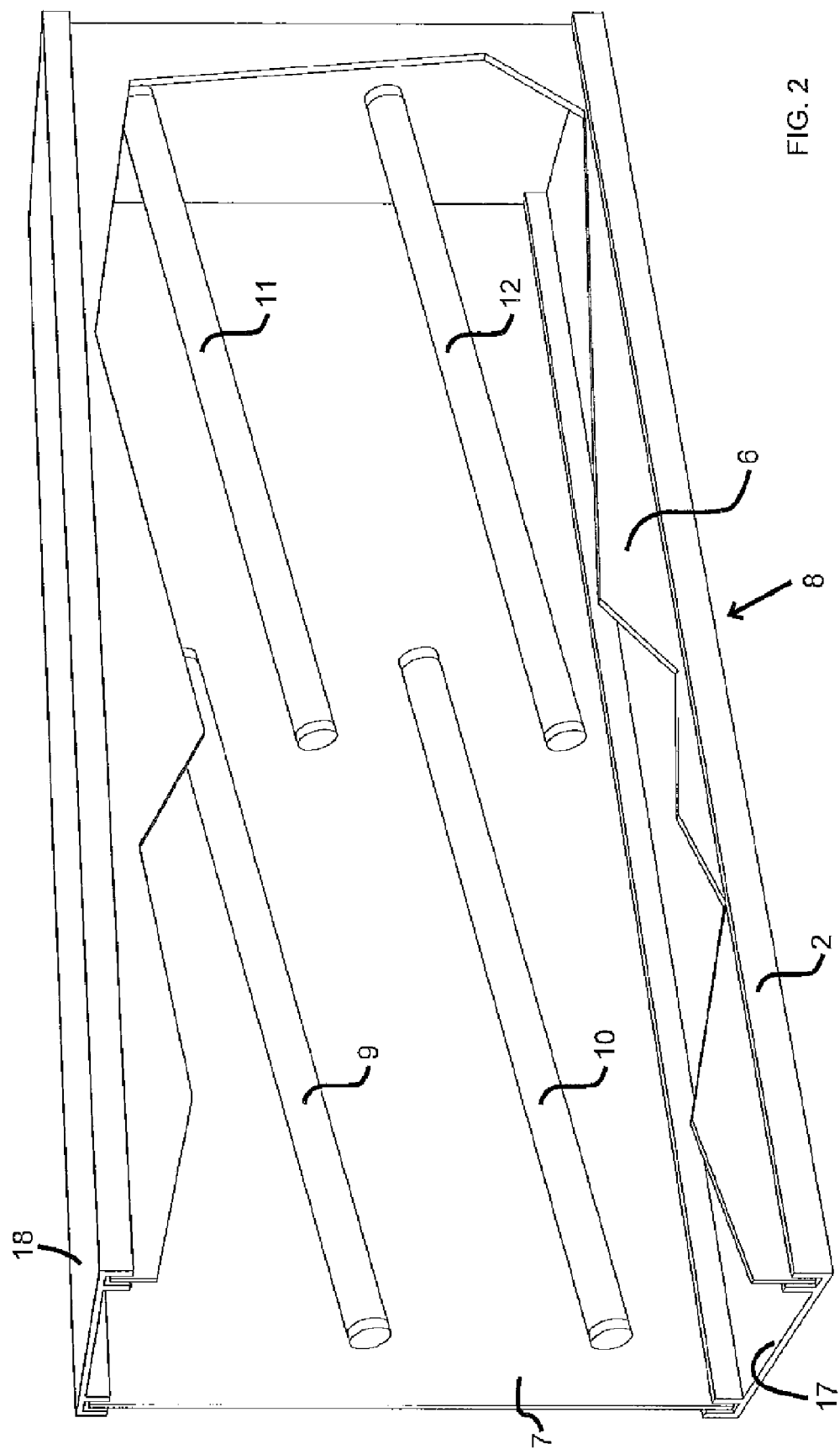
FIG. 2 shows a partly cut-away perspective view of another prior art display device.

In order to reduce said great variation, use is sometimes made of the arrangement according to FIG. 2. In this embodiment the display device 8 shown herein comprises four fluorescent lamps 9, 10, 11, 12 which are disposed such that the intensity distribution should result in a slightly more homogeneous image. This solution is not found to function well in practice. In the centre is located an area in which the intensities of the lamps more or less accumulate, which results in a peak in intensity in the centre while a relatively under-illuminated area is present on the edges, in accordance with the decay at the ends which is drawn in FIG. 8B.

Figure 3:
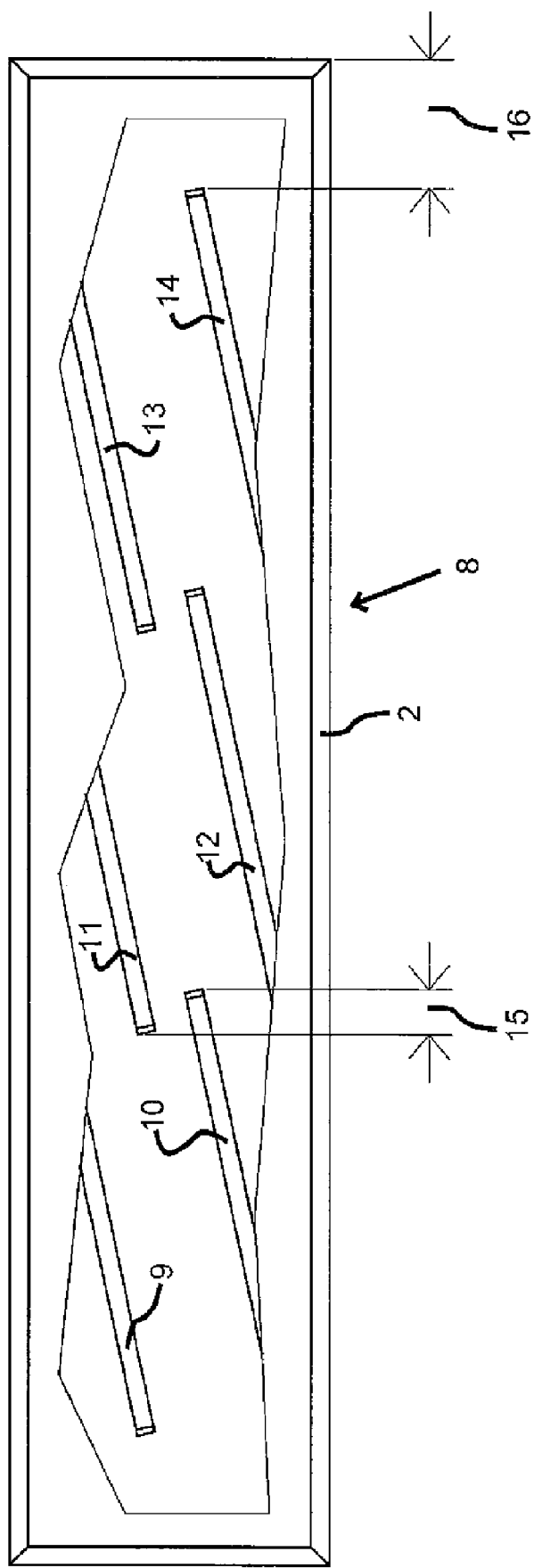
FIG. 3 shows a partial front view of the display device according to FIG. 2.

FIG. 3 shows the complete display device 8 with fluorescent lamps 9, 10, 11, 12, 13, 14. Said overlapping area is designated with 15. The relatively under-illuminated end edge area is designated with reference numeral 16.

Figure 4:
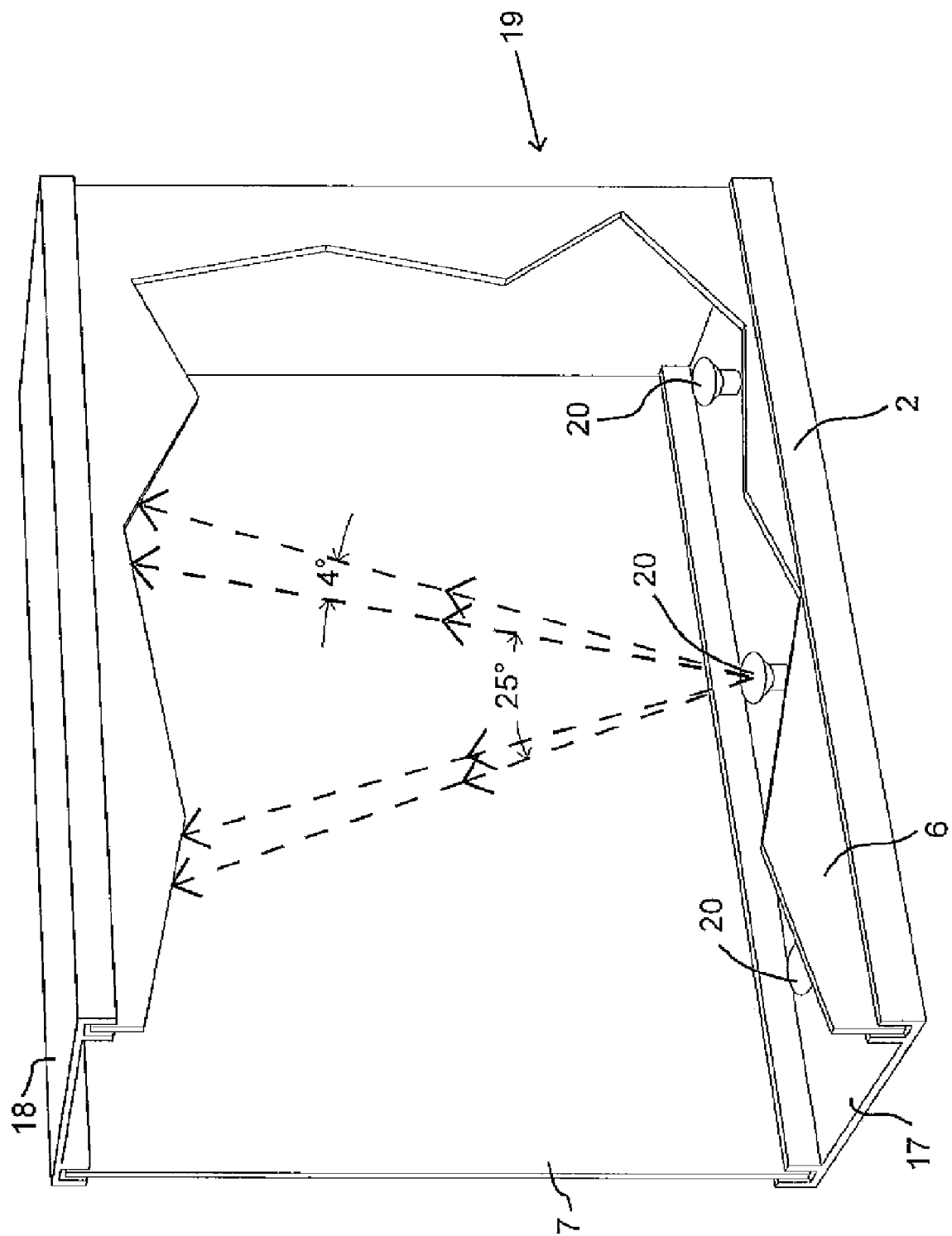
FIG. 4 shows a view corresponding with FIG. 1 of a display device according to the invention.

FIG. 4 shows a display device 19 according to the invention by way of example. Situated on bottom wall 17 is a row of substantially equidistantly arranged LEDs 20 which together form the light source for display device 19. Lens means are added to LEDs 20, which ensure that in the drawn manner the LEDs have an aperture angle of about 25° in the longitudinal direction of the opposite top wall 18 and an aperture angle of about 4° in the transverse direction. This choice and the dimensioning of the housing achieves that it is practically only the inner surface of top wall 18 that is illuminated more or less homogeneously by LEDs 20, and substantially no light coming directly from LEDs 20 is incident upon display faces 6, 7. The relevant light beams are shown in broken lines with upward directed arrows.

In order to realize the desired, more or less elliptical directional characteristic of LED 20 with an aperture angle of about 25° in the main direction and an aperture angle of about 4° in the direction perpendicular thereto, use can for instance be made of optical provisions from the Carclo Precision Optics company (www.carclo-optics.com), part number 10049.

Attention is drawn to the fact that translucent rear wall 7 can for instance be replaced by an opaque wall. This wall could also have a diffusely reflective character and could thus make a certain contribution to the intensity and the homogeneity of the light incident upon wall 6. The other display devices shown and described in this specification can as desired also have only one or two display faces.

Figure 5:
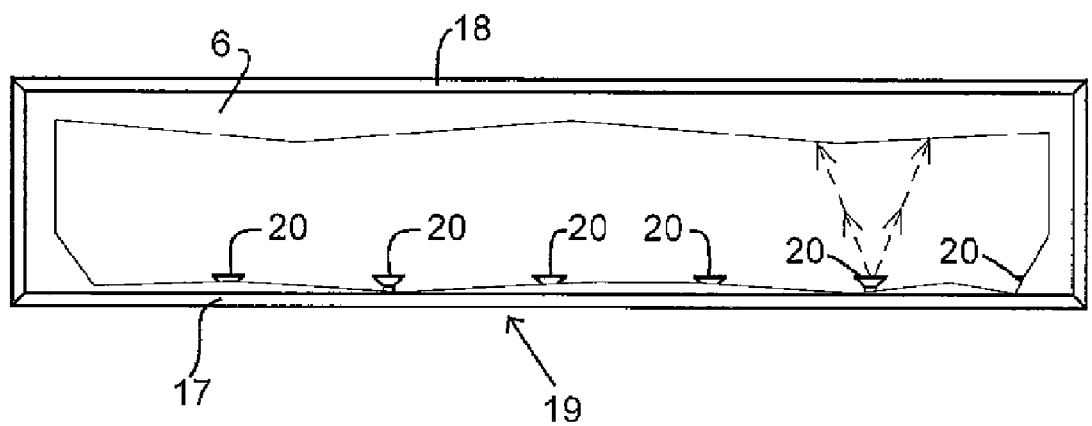
FIG. 5 shows a partly cut-away front view of the display device according to FIG. 4.

FIG. 5 shows the complete display device 19.

Figure 6:
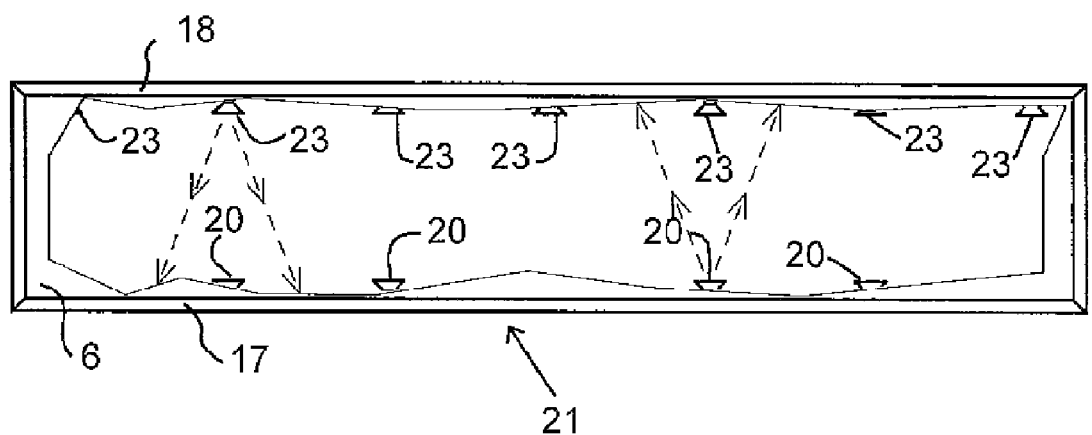
FIG. 6 shows a view corresponding with FIG. 5 of a variant.

FIG. 6 shows a display device 21 in a variant in which a row of LEDs 23 is situated on top wall 18 directly opposite LEDs 20 on bottom wall 17. The intensity achieved will hereby become twice as great. These LEDs also provide an improvement in the homogeneity of the luminance on the outside of the display face.

Figure 7:
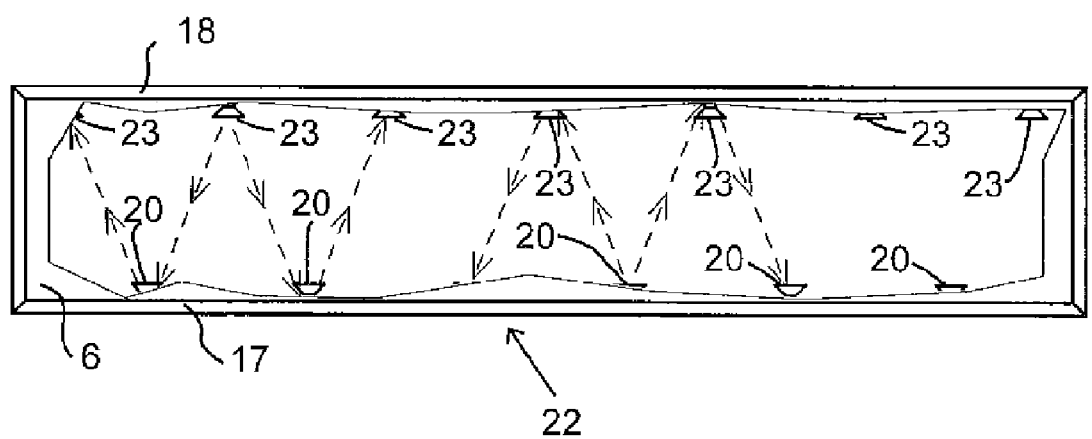
FIG. 7 shows a view corresponding with FIG. 6 of a modification of the embodiment according to FIG. 6.

FIG. 7 shows a display device 22 in which LEDs 23 are placed on top wall 18 offset half a pitch distance relative to LEDs 20 on bottom wall 17.

FIG. 9A shows display device 19.

FIG. 9B shows the intensity distribution of the light on outer surfaces 61, 62 of respective display faces 6 and 7. This amounts to about 140 lux with a maximum variation of + and −10%. It is noted here that even smaller, even considerably smaller intensities, can give the desired effect. It is for instance possible to envisage a light intensity in the order of 50 lux and less.

Figure 9C:
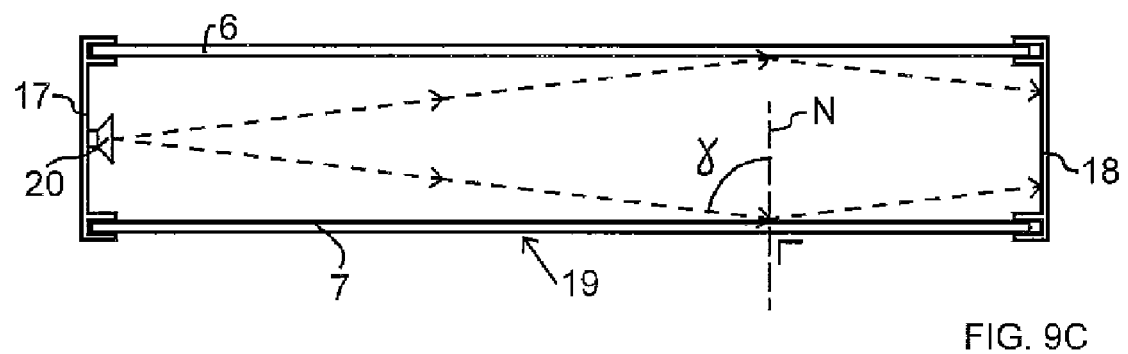
FIG. 9C shows a view corresponding with FIG. 9A of an embodiment in which the light sources have an aperture angle such that the diffusely translucent display faces are partly illuminated directly by the light sources.

FIG. 9C shows a display device largely corresponding with FIG. 9A. As a result of the orienting means (for instance lenses) added thereto, light source 20 has in this embodiment an increased aperture angle such that a part of the light emitted by light source 20 impinges upon the smooth inner side of display faces 6 and 7 at an angle of incidence γ relative to the normal N. As a result of the fact that the angle in question is larger than the Brewster angle, the relevant light will be reflected and impinge upon the diffusely reflective wall 18 in accordance with the pattern indicated with arrows. This wall 18 then begins to function as secondary diffuse source for illuminating the diffusely translucent display faces 6 and 7 such that they thereby exhibit a very constant luminance over their surface, as measured on the outside.

Figure 10:
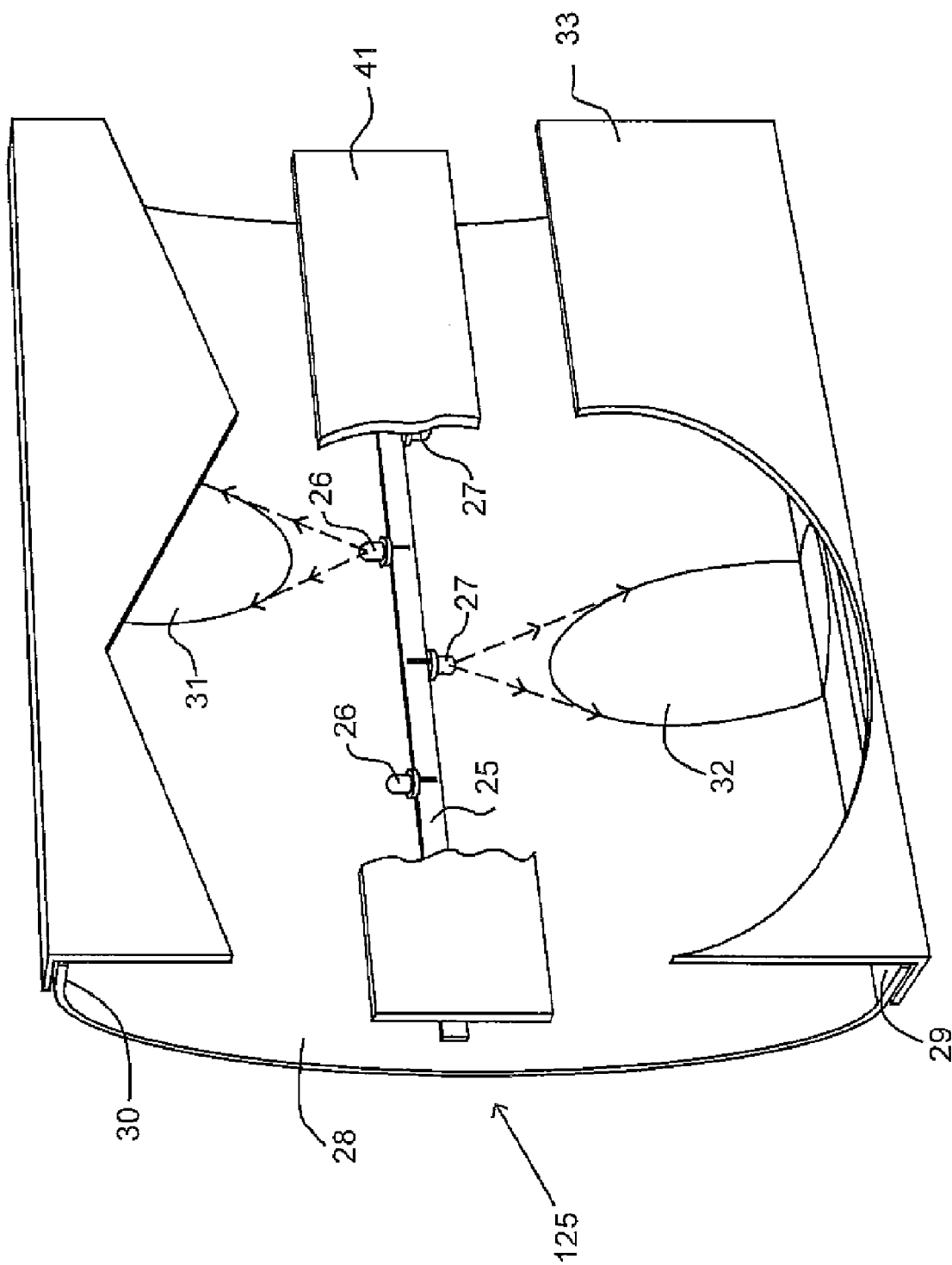
FIG. 10 shows a partly cut-away view of yet another embodiment.

FIG. 10 shows a display device 125 with an elongate carrier 25 having LEDs 26, 27 respectively oriented alternately upward and downward. These LEDs illuminate a curved, opaque, diffusely reflective rear wall 28 and edges forming part thereof, i.e. a lower edge 29 and an upper edge 30. The relevant radiation patterns of LEDs 26 and 27 are designated with ellipses 31, 32 respectively.

In order to prevent light from LEDs 26, 27 being directly incident upon display face 33 use is made in this embodiment of an elongate screen 41 which intercepts, and absorbs or reflects light coming directly from LEDs 26, 27, and in this case preferably reflects it diffusely.

It is important to note that, as can be seen in particular from radiation patterns 32, no light coming directly from LEDs 27 is incident upon display face 33. This could have a highly adverse effect on the homogeneity of the light intensity distribution.

Figure 11:
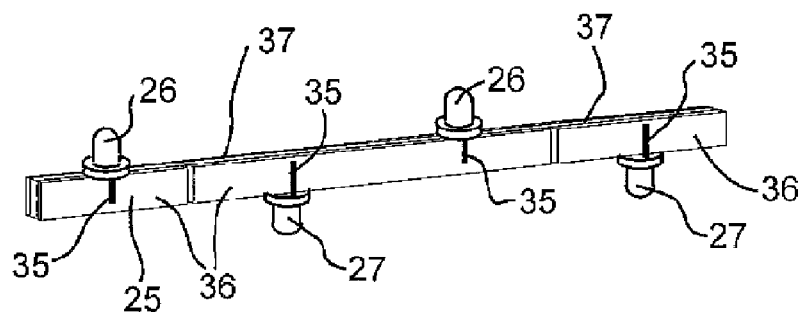
FIG. 11 shows a part of the light source according to FIG. 10.

FIG. 11 shows elongate carrier 25. LEDs 26, 27 are connected with their terminals, all designated with 35 for the sake of convenience, by soldering, welding or in other electrically conductive manner to conductive strips on the sides of insulating carrier 25. Copper strips 36 on the side of carrier 25 directed toward display face 33 are insulated from each other and placed offset relative to the functionally corresponding conductive strips 37 on the rear side of the carrier. The terminals (not visible) on the rear side are connected to these strips 37. It will be apparent that a series connection of the LEDs is realized in this manner.

The carrier can be embodied in known manner as a printed circuit-board, for instance in glass epoxy. The connections of the terminals of the LEDs and the strips can be effected by soldering, roll-spot welding or other suitable means.

Figure 12A:
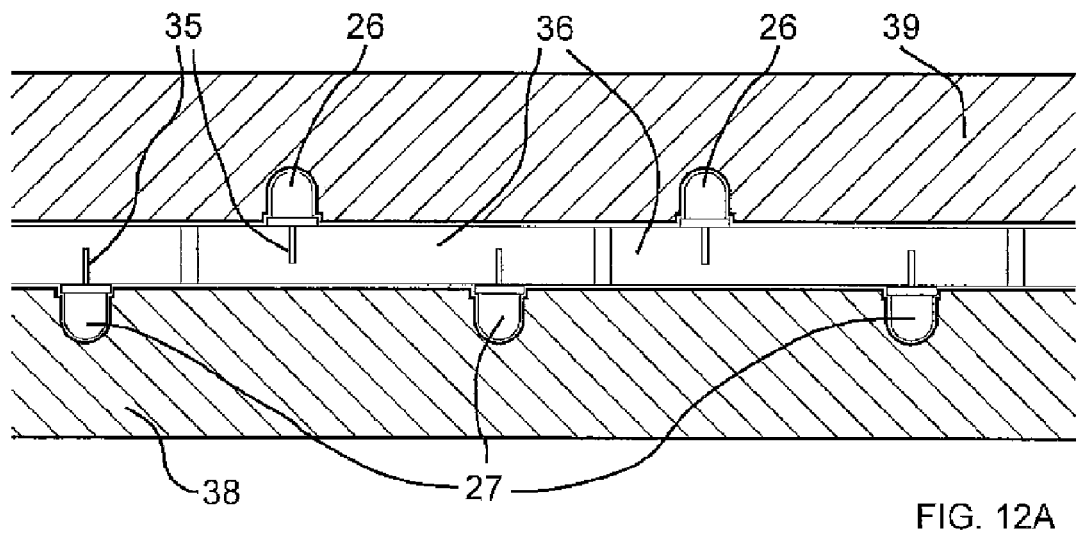
FIG. 12A shows a longitudinal section through a mould for manufacturing a light source with shielding against scattered light.

FIG. 12A shows schematically the manner in which carrier 25 with LEDs 26, 27 can be placed in a mould 38, 39 for correct mutual positioning.

Figure 12B:
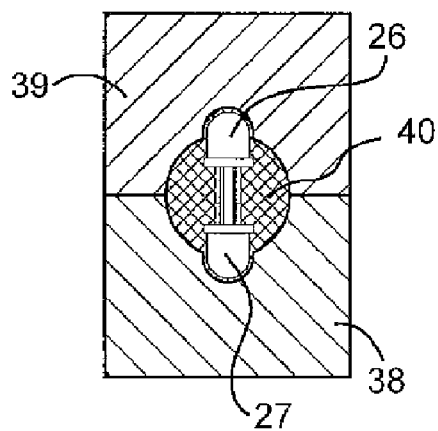
FIG. 12B shows a cross-section through the mould according to FIG. 12A.

FIG. 12B shows that mould 38, 39 can comprise an additional cavity which can for instance be filled with epoxy 40. After making said electrically conductive connections, said cavity can be filled with the epoxy, thereby creating the structure clearly visible in FIG. 12B. The epoxy mass, which in this embodiment is more or less cylindrical, provides an effective shielding of lateral scattered light, whereby screen 41 according to FIG. 10 is no longer necessary.

FIG. 13A shows schematically a display device 42 with one fluorescent lamp 43.

FIG. 13B shows the cross-section.

FIG. 13C shows the intensity distribution. As can be seen clearly, it has a very inhomogeneous character. The intensity varies between respective values of 100 lux at the edge zones and about 400 lux in the central zone. This prior art display device therefore has precisely those drawbacks for which the invention intends to provide a solution.

FIG. 14 shows by way of comparison the display device 125 according to FIG. 10 and the results obtained therewith.

FIG. 14A shows a cut-away view of display device 125.

FIG. 14B shows a cross-section. As shown from this figure, the aperture angle of LEDs 26, 27 can in this case lie in the order of 8°.

FIG. 14C shows the distribution of the light intensity on display face 33. It will be apparent that, while the intensity is considerably lower than that which can be realized with the direct illumination using a fluorescent lamp as according to FIG. 13, it has a dramatically improved homogeneity. This homogeneity is a measure of the quality of the display device.

Figure 15:
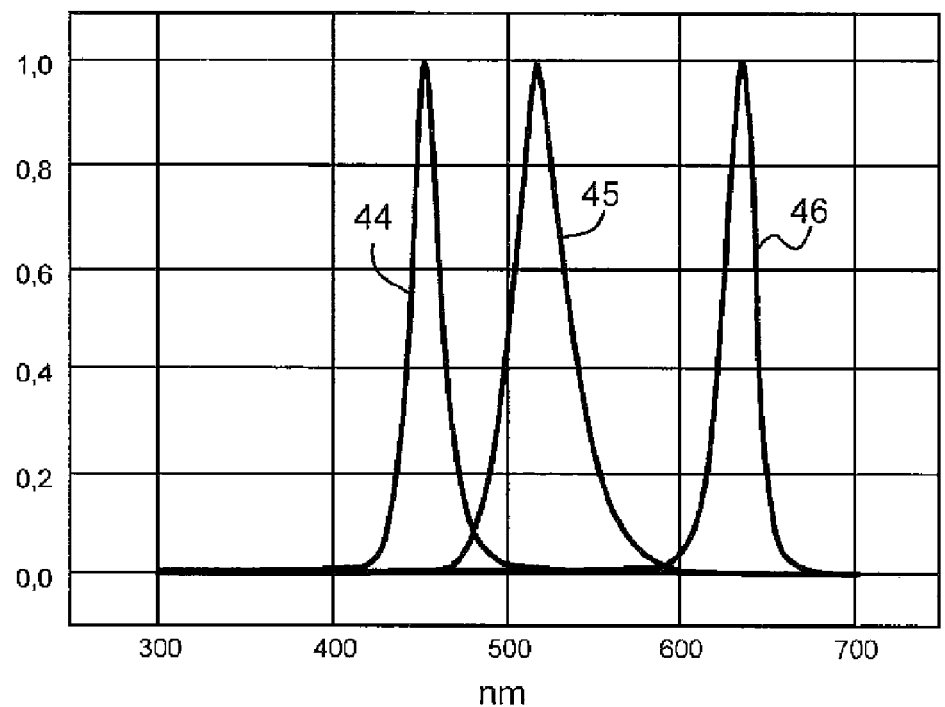
FIG. 15 shows a graphic representation of the spectral distribution of a red, a green and a blue LED.

FIG. 15 shows the relative spectral energy distribution of three differently coloured LEDs. Curve 44 corresponds with blue light; curve 45 corresponds with green light and curve 46 corresponds with red light.

It is noted that in combination these three colours can produce white light. Use can be made of this property to realize almost any desired colour for a display device by switching and intensity control of groups of red, green and blue LEDs.

Figure 16:
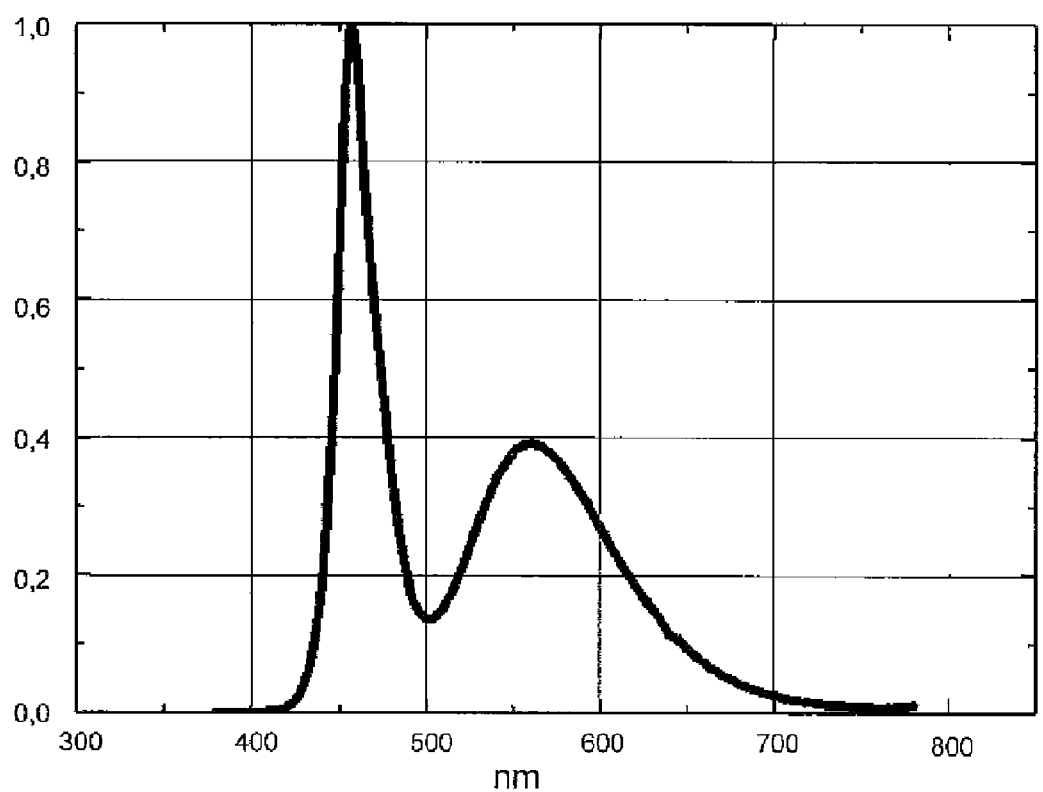
FIG. 16 shows the spectral distribution of the cold white light emitted by a LED of a determined type.

FIG. 16 shows the relatively spectral energy distribution of a commercially available LED which emits cold, slightly bluish white light.

Figure 17:
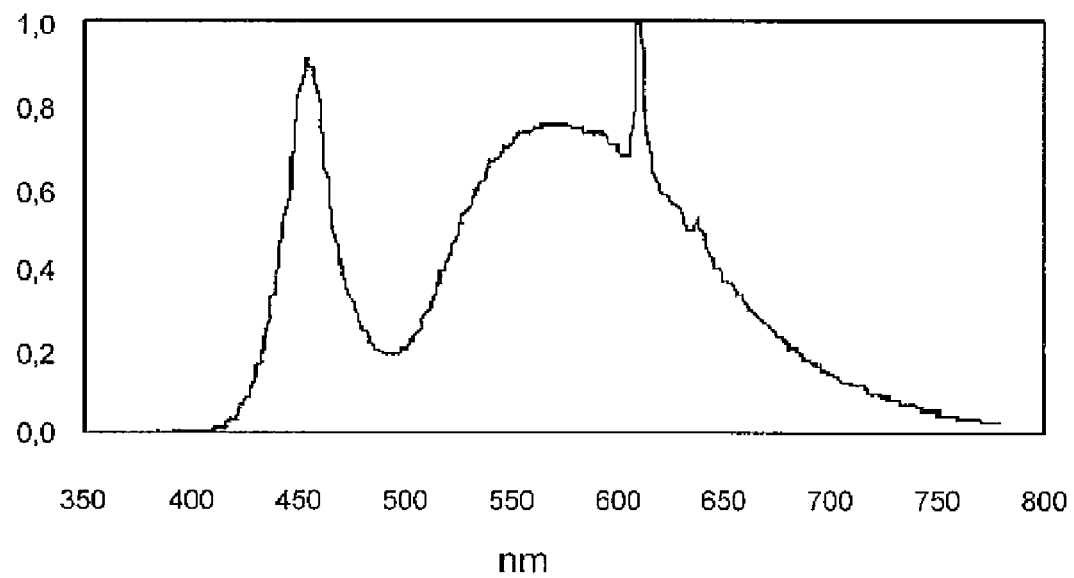
FIG. 17 shows a spectral distribution of the cold white light emitted by a LED of a different type.

FIG. 17 shows the relatively spectral energy distribution of a commercially available LED, which also emits cold white light. This LED is available from the Nichia company and would for instance be very suitable for application in traffic signs.

Figure 18:
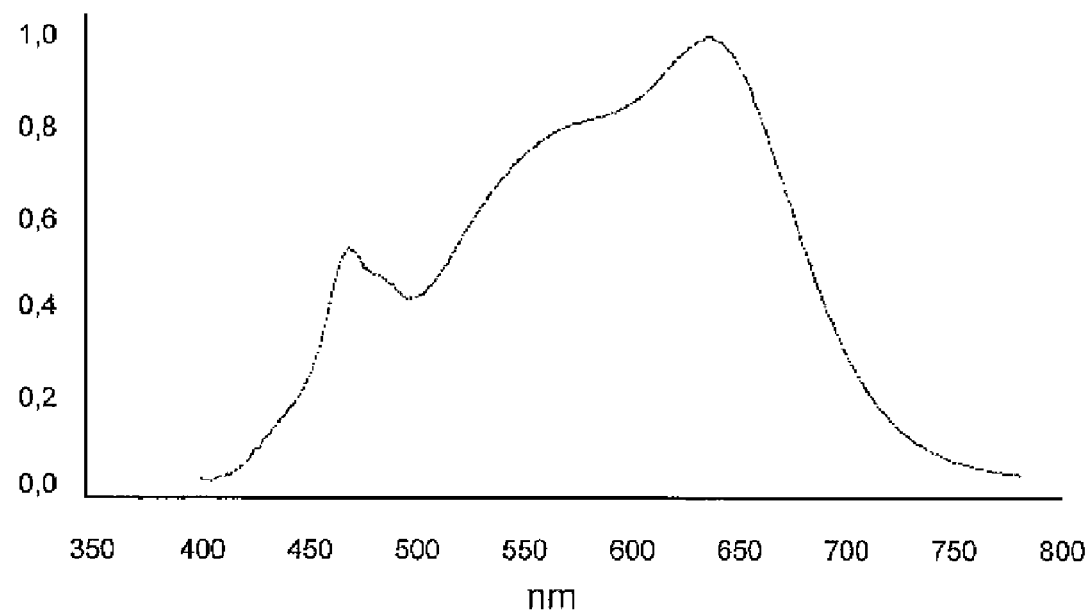
FIG. 18 shows a spectral distribution of the light emitted by a warm white LED.

FIG. 18 shows a relatively spectral energy distribution of warm white light which is emitted by a commercially available LED from the firm Lumiled. This colour is often perceived as being very pleasant and comprises a greater proportion in the red range relative to the blue range. Use of LEDs of this type is particularly important for presenting information on a display face comprising the colour red. Through irradiation with cold white light (FIGS. 16 and 17) the effect of the colour red could after all be diminished as a result of metamerism, and thus decrease the true-to-life nature of the display.

For universal applications it is possible to envisage a combination of, on average, a ratio of two cold white LEDs to one warm white LED.

For determined applications it is of course also possible to envisage the use of LEDs of other colours, or combinations of colours.

Figure 19A:
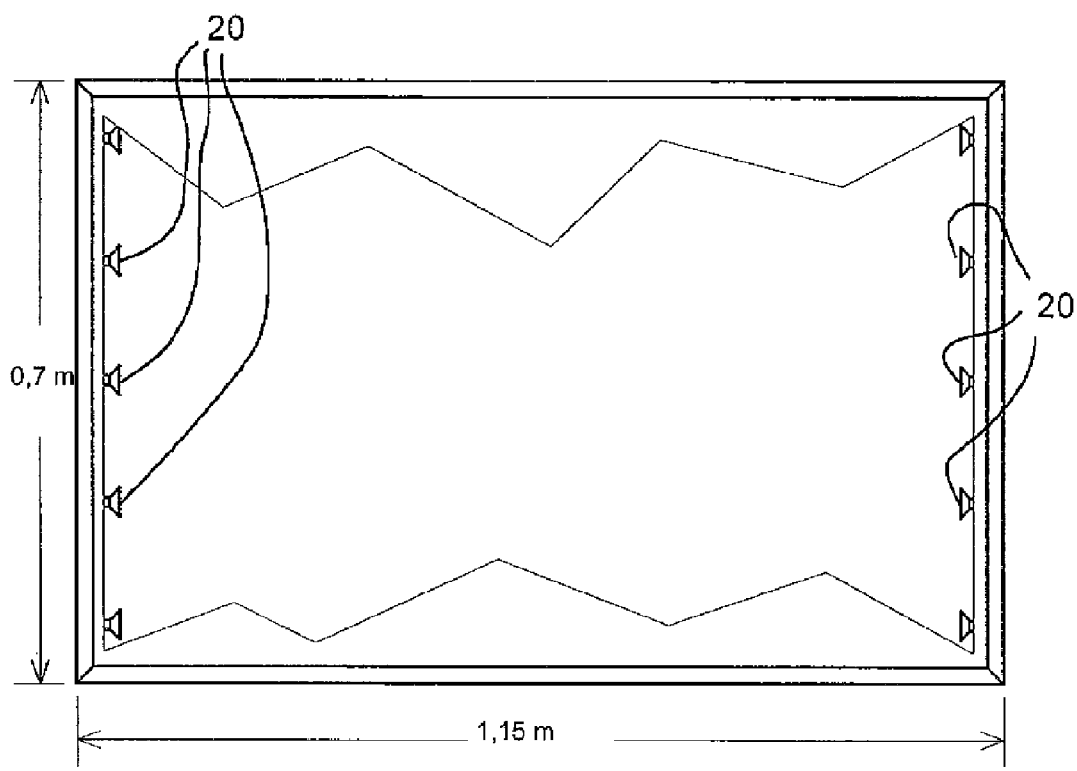
FIG. 19A shows a cross-section through a light box according to the invention which is provided on both sides with a row of light sources.

FIG. 19A shows an exemplary embodiment of a light box according to the invention. The outer dimensions of the box are specified as 1.15 m×0.7 m. Five LEDs with bundle lenses are situated on both short sides such that the light from LEDs 20 is directed at the respective opposite wall on which the other row of LEDs is situated. This wall is diffusely reflective.

Figure 19B:
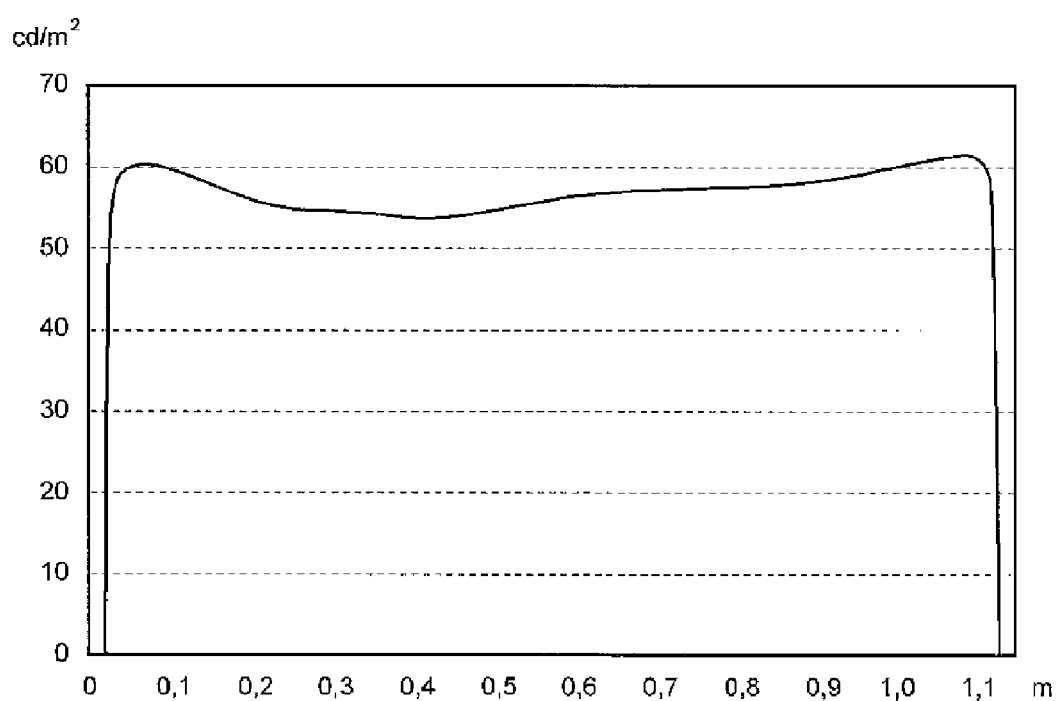
FIG. 19B shows a graph of the measured luminance as a function of the location on the outside of the display face, measured in the direction which is horizontal in the drawing.

FIG. 19B shows the luminance as a function of the location in the direction of the long side of the light box according to FIG. 19A. As can be seen clearly, the luminance varies between about 53 cd/m² and 62 cd/m².

It will be apparent from FIG. 19B that the luminance varies little over the whole width of the light box.

Figure 19C:
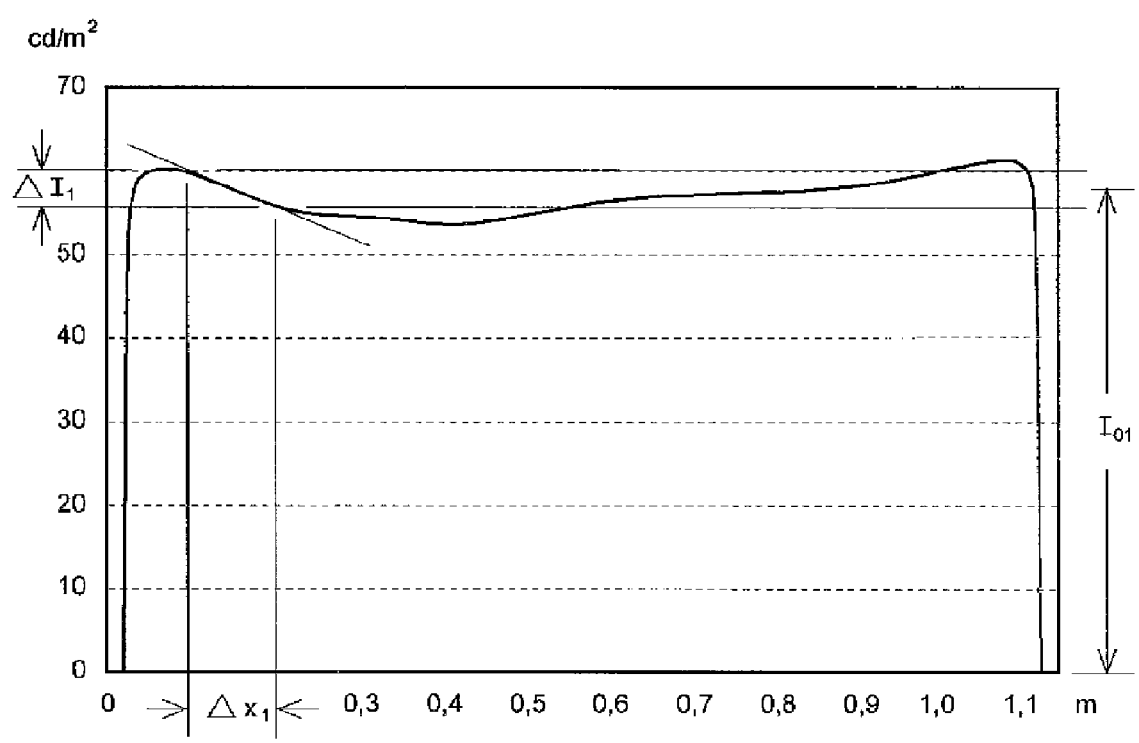
FIG. 19C shows the graph according to FIG. 19B, which also includes indications for calculating the first derivative of the normalized luminance.

FIG. 19C substantiates this quantitative observation.

In the area of the greatest value of the first derivative to the position of the normalized luminance the difference in luminance $\Delta I1$ is determined over a certain finite route and the associated $\Delta x1$ is here also determined. According to the invention the value of the first derivative to the position of the normalized luminance is deemed to be representative. According to FIG. 19C this derivative is approximated with finite ranges by first normalizing $\Delta I1$ by dividing it by the average intensity $I01$ in the relevant interval, and dividing the thus obtained normalized luminance difference by the associated interval $\Delta x1$.

In this case the average luminance is 58.0 cd/m².

$$\Delta I1 = 4.5 \text{cd/m}^2$$

$$\Delta x1 = 0.105 \text{m}$$

On this basis the value of the important quantity $Q = \Delta(I_1/I_{1o}))/\Delta x = 0.74$ m$^{-1}$.

This latter value is lower, and even considerably lower, than the standard value in the order of 1.1 m$^{-1}$ as determined by way of orientation according to the invention. This means that the quality of the exiting light must be deemed as very good. No luminance transition will be discernible to the eye.

It is noted that FIGS. 19B and 19C show that a slight increase in the luminance occurs at the edges. This must be attributed to a small fraction of the direct light from the LEDs. Even with a specific lens attachment serving as orienting means, the applied LEDs are found to have a small side lobe, whereby the luminance of the display face in the immediate vicinity of the LEDs increases by several percent. As will be apparent from the determined value of Q, this small fraction of the per se undesired light is completely harmless. If desired, even this small undesired effect can be eliminated by shielding the side lobe in question.

Figure 20A:
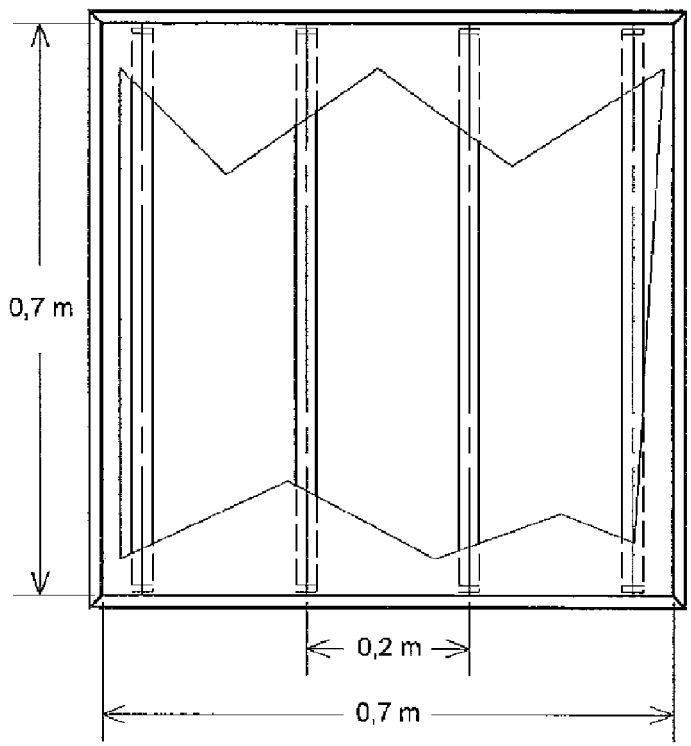
FIG. 20A shows a view corresponding with FIG. 19A of a prior art light box in which four fluorescent lamps are used as light sources.

FIG. 20A shows a light box with four fluorescent lamps. The box has inner dimensions of 0.7 m×0.7 m. The fluorescent lamps are disposed at mutual pitch distances of 0.2 m.

The box according to FIG. 20A has a depth of 0.2 m. The fluorescent lamps are disposed at a centre distance of about 0.1 m relative to the display face.

Figure 20B:
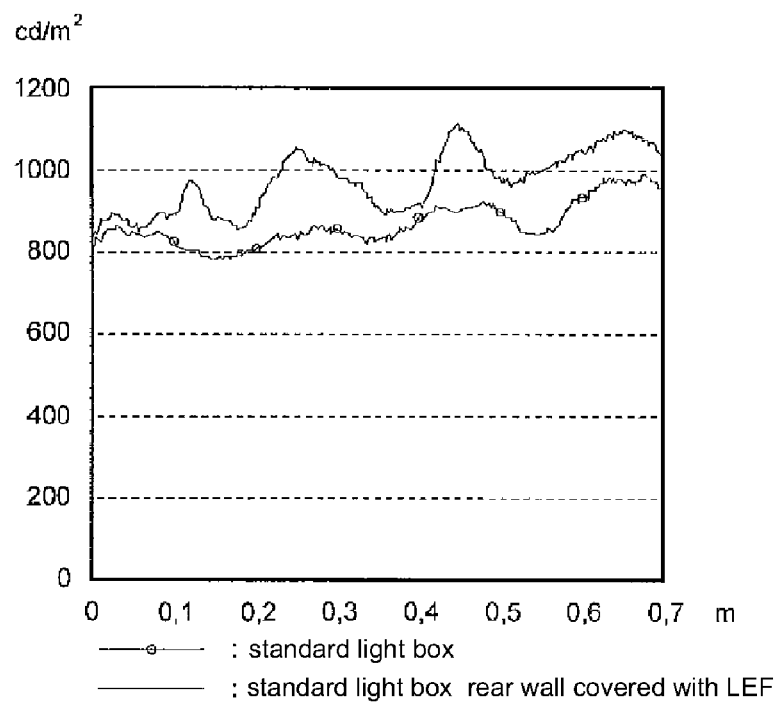
FIG. 20B shows a graphic representation corresponding with FIG. 19B of the luminance as a function of the location.

FIG. 20B shows the luminance as a function of the location. The graph marked with small circles relates to a generally usual or standard light box, the inner walls of which consist of common, untreated aluminium of usual quality. The unmarked graph relates to an embodiment in which the rear wall is covered with LEF film (3M Company trademark).

Figure 20C:
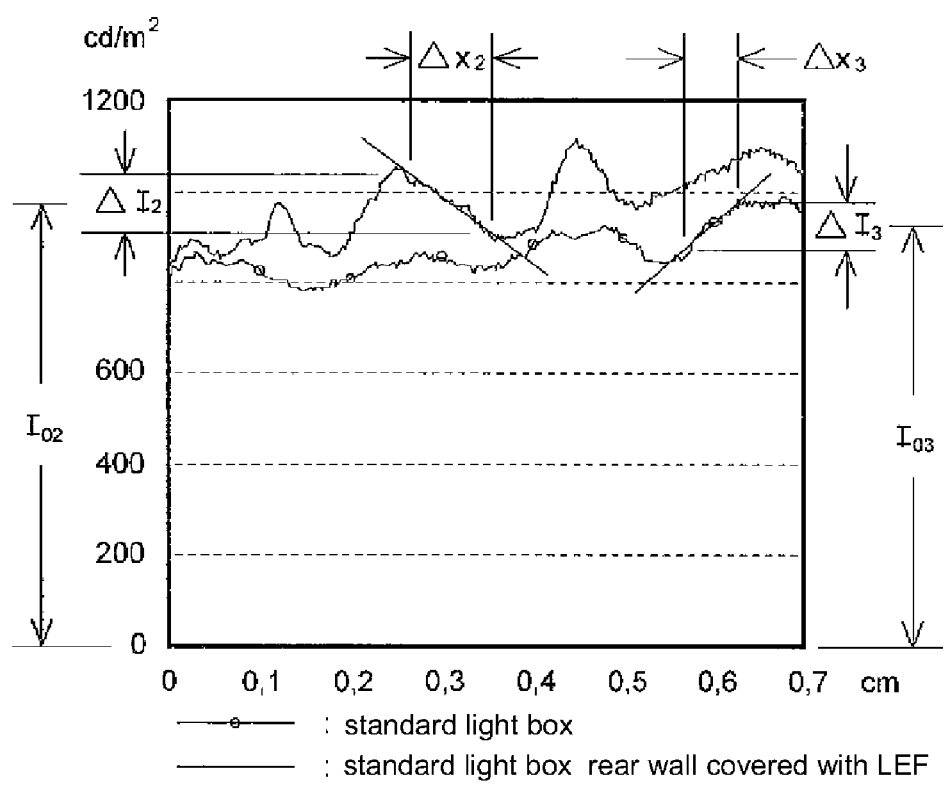
FIG. 20C shows a representation corresponding with FIG. 19C of the graph according to FIG. 20B.

FIG. 20C again shows the graph according to FIG. 20B, but in this figure the values of the quantity Q are calculated for both described embodiments.

For the standard light box the average luminance amounts to $I03$ 925 cd/m².

$$\Delta I3 = 106 \text{cd/m}^2$$

$$\Delta x = 0.06 \text{m}$$

On the basis of these values $Q = 1.91$ m$^{-1}$. It will be apparent that this value demonstrates that great differences in intensity are discernible with the naked eye. They are so great that they are adjudged in practice to be irritating and possibly even unacceptable.

The light box with LEF film has an average intensity of 974 cd/m².

$\Delta I = 130\, cd/m^2$ $\Delta x = 0.09\, m$ $Q = 1.48\, m^{-1}$

Figure 21A:
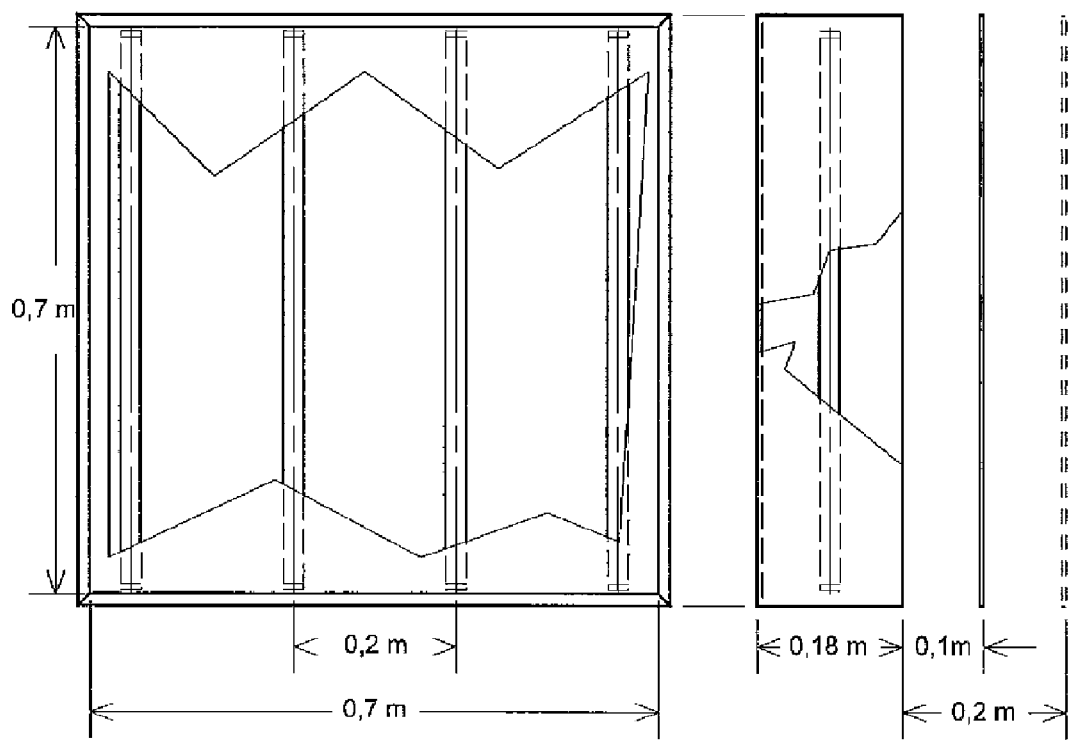
FIG. 21A shows, in horizontal direction, respectively the front view of the light box according to FIG. 20A and a partially broken-away side view, wherein the display face is shown at different distances, for the introduction of the measurements, the measurement results of which are presented in FIG. 21B.

FIG. 21A relates to the placing of the display face at different positions. FIG. 21A shows the display face in two positions such that the distance of the fluorescent lamps becomes increasingly greater, this at a rate of 0.1 m.

Figure 21B:
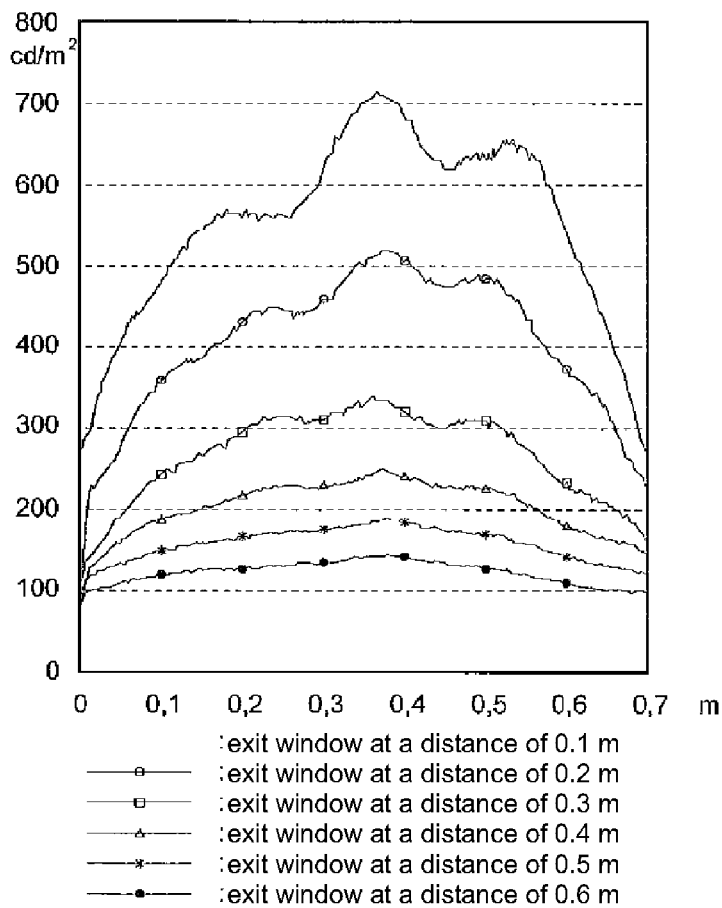
FIG. 21B shows six graphs in which the luminance on the outer surface of the display face of the light box is drawn according to FIG. 21A, with the distance of the display face from the starting position as parameter.

FIG. 21B shows the results.

The unmarked figure relates to the situation shown with full lines in FIG. 21A, in which the display face lies at a distance of 0.1 m relative to its standard position. It will be apparent that much light is lost at the edges. The edge zones will therefore be strongly under-illuminated relative to the central zone, which however itself displays great luminance differences over short distances.

The graph marked with circles relates to a distance of 0.2 m.

The graph marked with squares relates to a distance of 0.3 m.

The graph marked with triangles relates to a distance of 0.4 m.

The graph marked with asterisks relates to a distance of 0.5 m.

The graph marked with closed circles relates to a distance of 0.6 m.

Figure 21C:
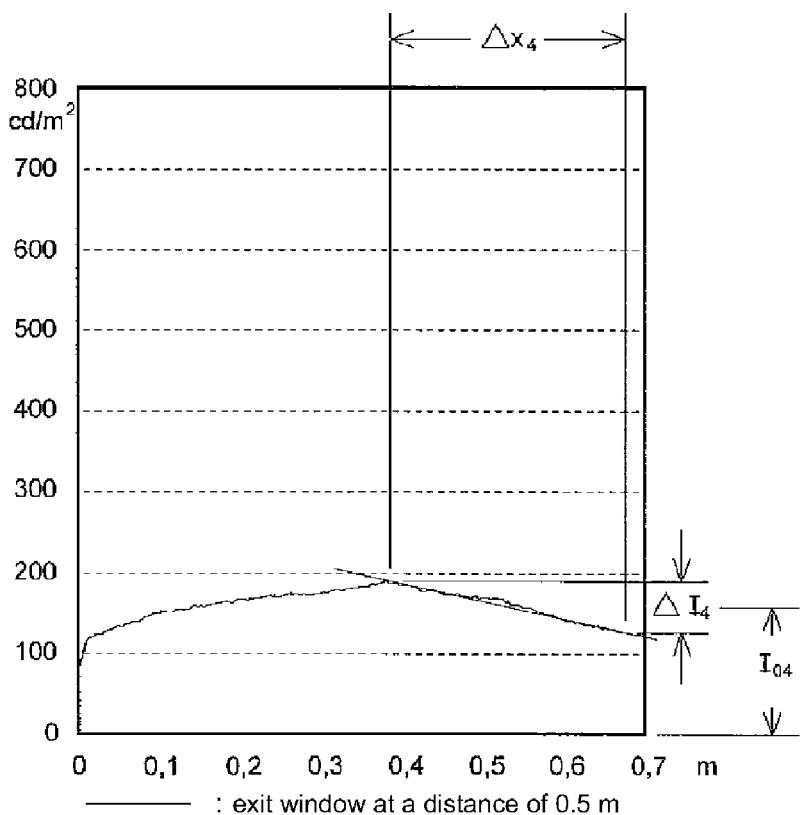
FIG. 21C shows a graphic representation of the luminance as a function of the location in the case where the display face is placed at a distance of 0.5 m, having indications therein for calculating the first derivative of the normalized luminance.

FIG. 21C shows the determination of Q for a distance of 0.5 m. This amounts to 1.37 m⁻¹. Although far from ideal in relation to the standards of the invention, this value for the gradient is still acceptable for some applications.

Figure 21D:
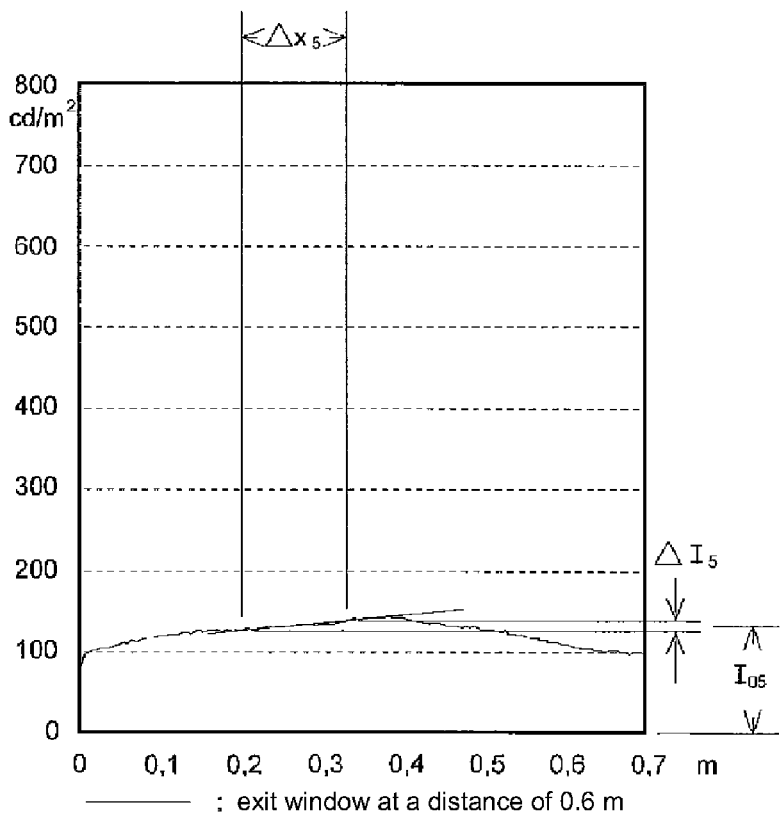
FIG. 21D shows a graphic representation corresponding with FIG. 21C of the situation where the display face is placed at a distance of 0.6 m.

FIG. 21D relates to a distance of 0.6 m. In this arrangement Q has a value of 0.75 m⁻¹. This must be adjudged as very good. It must however be noted here that this high quality is achieved by making use of four fluorescent lamps, each with its own nominal power of about 30 W, which implies a net energy consumption of about 120 W. The energy loss of the chokes must then also be added thereto. Depending on the embodiment, this amounts for instance to 5 to 10 Watt per fluorescent lamp. This very high energy consumption compared to LEDs (a LED bar according to the invention with comparable results will consume energy in the order of about 15 to 30 W) could perhaps still be acceptable for determined applications, but it will be apparent that a light box with a depth in the order of 0.7 m is not suitable for practically any application.

Figure 22A:
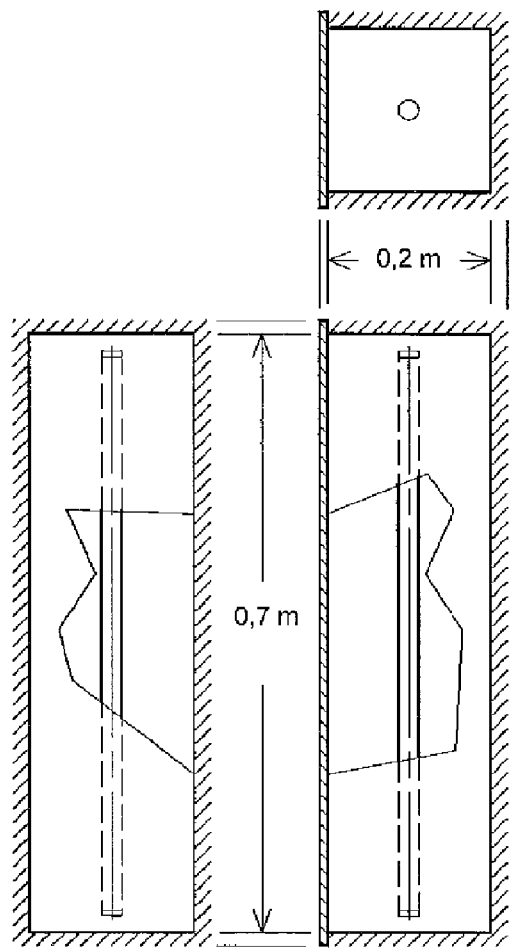
FIG. 22A shows a front view, a side view and a top view of a light box, the inner surfaces of which are covered with an LEF film (3M Company trademark)

FIG. 22A relates to a light box which is closely related to the light box according to WO-A-99/67663, which has already been discussed above.

Figure 22B:
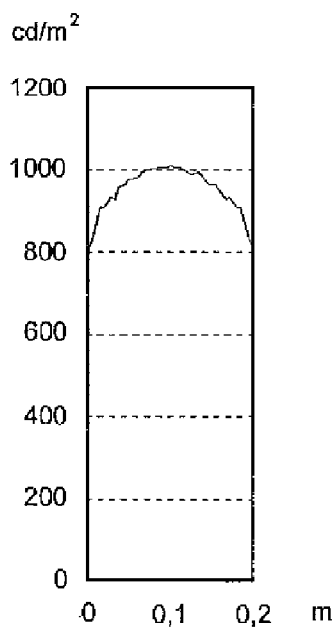
FIG. 22B shows the luminance distribution on the outer surface of the display face of the light box as according to FIG. 22A.

FIG. 22B shows the luminance function of the location.

Figure 22C:
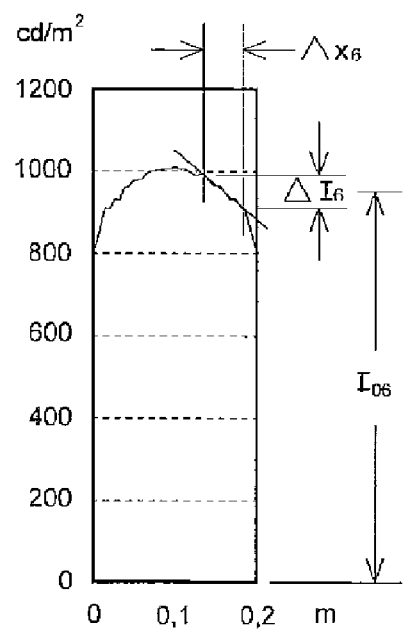
FIG. 22C shows the graph according to FIG. 22B, in which the necessary data are included for the purpose of calculating the first derivative of the normalized luminance.

The calculation of Q according to FIG. 22C produces a value of Q=1.75 m⁻¹. It will be apparent that this result leaves much to be desired.

Figure 23:
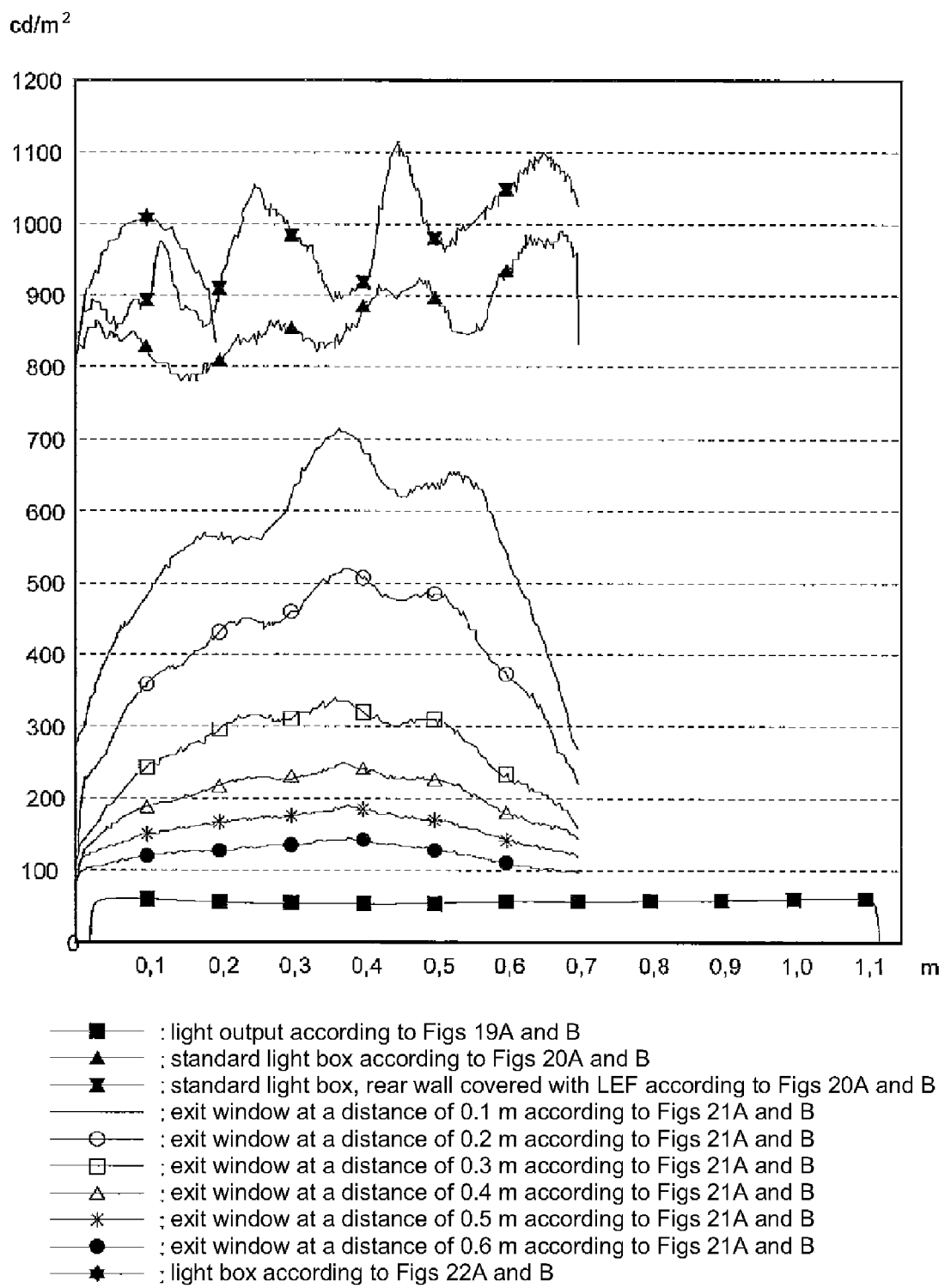
FIG. 23 shows one graphic representation in which all luminance graphs of FIGS. 19A, 19B, 20A, 20B (in two versions), 21A, 21B, 22A and 22B are shown by way of illustration of the superior qualities of the light box according to the invention.
Figure 24:
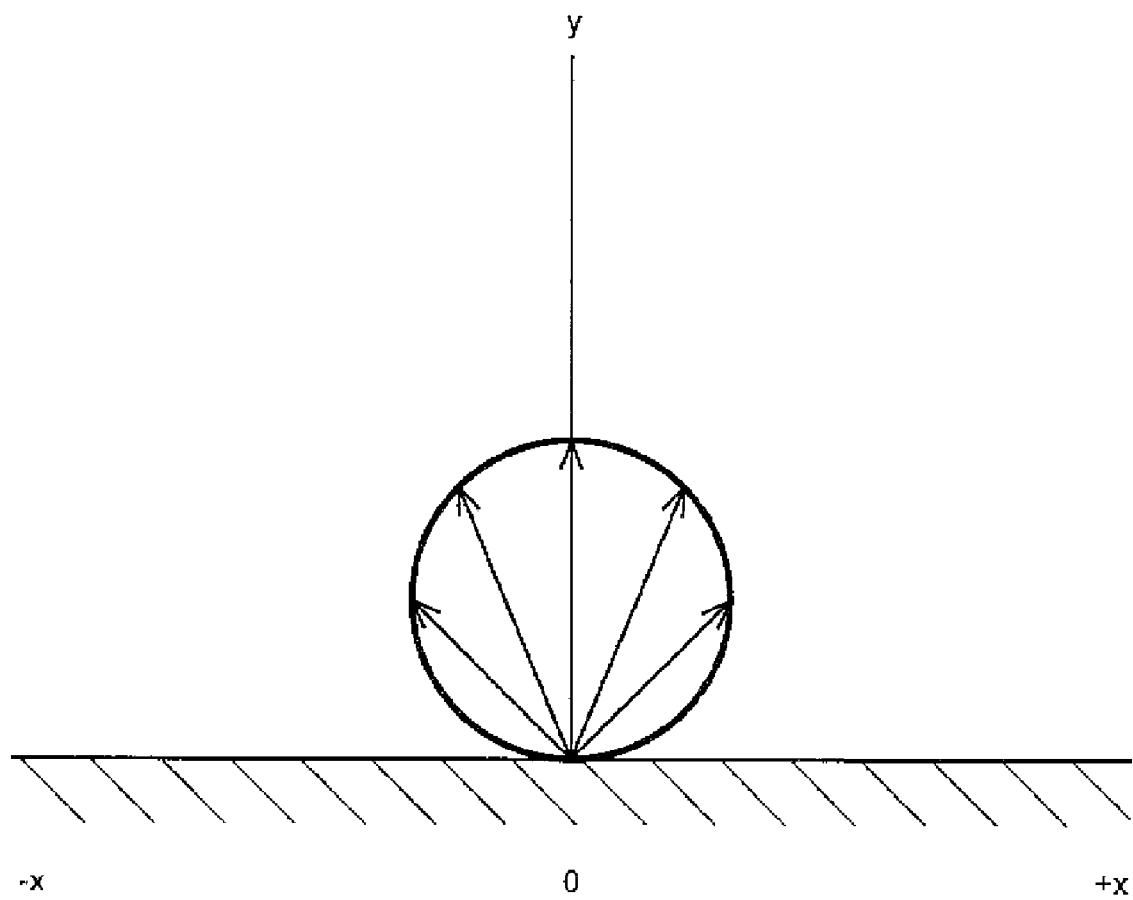
FIG. 24 shows the directional characteristic of a diffusely reflective surface in two-dimensional representations.

FIG. 23 shows a bundle of ten graphs, i.e. a summary of the graphs drawn above.

The graph drawn with black squares is the luminance according to FIG. 19, so the light box constructed in accordance with the teaching of the invention.

The graph marked with black triangles relates to the standard light box according to FIG. 20.

The graph marked with black diabolos relates to the standard light box wherein the rear wall is covered with LEF film according to FIG. 20.

The unmarked figure relates to the situation with display face at 0.1 m according to FIG. 21.

The figure marked with circles relates to a distance of 0.2 m.

The graph marked with squares relates to a distance of 0.3 m.

The graph marked with triangles relates to a distance of 0.4 m.

The graph marked with asterisks relates to a distance of 0.5 m.

The graph marked with a black circle relates to a distance of 0.6 m.

The graph marked with a black star relates to the light box according to FIG. 22.

From the above comparison, and comparison of the value of the quantity Q chosen as standard according to the invention, it will be apparent that only the graph marked with the black squares satisfies the standard of Q<1.0-1.2 m⁻¹, also taking into account a small depth and a low energy consumption. The conclusion must be drawn that, despite many generally known techniques and general knowledge of the skilled person in this field, the invention is able to realize the stated object using simple means.

The invention claimed is:

1. A display device comprises: a housing; a light source accommodated in the housing; and at least one diffusely translucent display face illuminated by the light from the light source; wherein orienting means are added to the light source to obtain a directional characteristic of the light emitted by the light source such that the light source directly illuminates at least one wall almost exclusively and the at least one wall is diffusely reflective such that a part of the light incident thereon is reflected to the display face.

2. Display device as claimed in claim 1, wherein the proportion of the light energy of the light which is oriented directly at the display face by the light source and exits through the display face amounts to less than 10% of the total light energy of the light emitted by the light source.

3. Display device as claimed in claim 1, wherein the first derivative to the position of the luminance on the outer surface of the display face divided by the local value of the luminance has a maximum value of about 1.0-1.2 $\pi f^1$ in any direction.

4. Display device as claimed in claim 1, wherein the orienting means are integrated with the light source.

5. Display device as claimed in claim 1, wherein the orienting means comprise optical means from the group of which mirror means and lens means form part.

6. Display device as claimed in claim 1, comprising shielding means placed between the light source and the display face for the purpose of shielding light oriented directly at the display face by the light source.

7. Display device as claimed in claim 1, wherein the light source extends over a distance of at least about 70% of a linear dimension of the display face.

8. Display device as claimed in claim 7, wherein the light source comprises at least one elongate lamp.

9. Display device as claimed in claim 8, wherein the lamp is of the luminescence type, for instance a fluorescent lamp.

10. Display device as claimed in claim 1, wherein the light source comprises a LED or at least one group of LEDs extending in substantially the same direction.

11. Display device as claimed in claim 10, wherein a group of LEDs are disposed adjacently of each other in a row.

12. Display device as claimed in claim 1, wherein the or a directly illuminated first wall extends at least more or less in transverse direction relative to the display face.

13. Display device as claimed in claim 1, comprising at least one second diffusely reflective wall, which receives part of the light reflected by the first diffusely reflective wall and directs a part thereof at the display face.

14. Display device as claimed in claim 1, wherein the directional characteristic is such that the light source illuminates the or a directly illuminated wall at least more or less homogeneously, or ensures that the directly illuminated wall forms an at least more or less homogeneous line source.

15. Display device as claimed in claim 1, wherein the at least one wall is provided with a light coloured, in particular substantially white cover layer consisting of a material from the group which includes: a matt paint, a paint with satin gloss, white paper, LEF film {3M Company trademark).

16. The display device of claim 1 wherein the display device is a an illuminated advertisement, a traffic sign, a signpost, an illuminated ceiling, a TFT screen, an LCD screen or a dial for a clock or a measuring instrument.

17. The display device of claim 1 wherein more than 75% of the light emitted from the light source illuminates the at least one wall.

* * * * *